United States Patent [19]

Dobson

[11] Patent Number: 5,072,130

[45] Date of Patent: Dec. 10, 1991

[54] ASSOCIATIVE NETWORK AND SIGNAL HANDLING ELEMENT THEREFOR FOR PROCESSING DATA

[76] Inventor: Vernon G. Dobson, 98 Botley Road, Oxford, OX2 OHH, England

[21] Appl. No.: 312,804

[22] PCT Filed: Aug. 7, 1987

[86] PCT No.: PCT/GB87/00559

§ 371 Date: Feb. 7, 1989

§ 102(e) Date: Feb. 7, 1989

[87] PCT Pub. No.: WO88/01079

PCT Pub. Date: Feb. 11, 1988

[30] Foreign Application Priority Data

Aug. 8, 1986 [GB] United Kingdom ............... 8619452

[51] Int. Cl.$^5$ .............................................. G06F 15/42
[52] U.S. Cl. ................................... 307/201; 364/807; 395/24
[58] Field of Search ................. 307/201; 364/513, 807

[56] References Cited

U.S. PATENT DOCUMENTS

| | | | |
|---|---|---|---|
| 3,496,382 | 2/1970 | Hendrix | 307/201 |
| 3,691,400 | 9/1972 | Askew | 307/201 |
| 3,950,733 | 4/1976 | Cooper et al. | 307/201 X |
| 4,518,886 | 5/1985 | Clymer | 307/201 |
| 4,660,166 | 4/1987 | Hopfield | 307/201 X |
| 4,731,747 | 3/1988 | Deuker | 364/807 |
| 4,782,460 | 11/1988 | Spencer | 364/807 |

OTHER PUBLICATIONS

International Search Report for international application No. PCT/GB87/00559.
Willwacher, G., Fähigkeiten eines assoziativen Speichersystems im Vergleich zu Gehirnfunktionen, *Biol. Cybernetics*, 24(4):181-198, 1976.

Fukushima, K., A Model of Associative Memory in the Brain, *Kybernetik*, 12:58-63, 1973.
Hirai, Y., A Learning Network Resolving Multiple Match in Associative Memory, Proceedings of Sixth International Conference on Pattern Recognition, IEEE Computer Society Press, pp. 1049-1052, 1982.
Sivilotti, M., et al., A Novel Associative Memory Implemented Using Collective Computation, 1985 Chapel Hill Conference on VLSI, H. Fuches, ed., Computer Science Press, pp. 329-342, 1986.

*Primary Examiner*—David Hudspeth
*Attorney, Agent, or Firm*—Christensen, O'Connor, Johnson & Kindness

[57] ABSTRACT

A signal processing network circuit which may be used, for example, as a filter or an associative memory has elements (101, 102, 103, 104) each having a respective input conductor (85, 86, 87, 88) and a respective output conductor (81, 82, 83, 84) a teach cell (T) and a recall cell (R). Each input conductor (85, 86, 87 or 88) has a number of memory cells (M) serving as signal coupling devices between output conductors of other generators and the input conductor. In a teach phase, paths through the memory cells (M) are interrupted whenever the output conductor is high and the input conductor is low. Each teach cell causes the input conductor of the respective generator to be low if the output conductor is high. In a recall phase, the recall cells (R) receive input signals from their input conductors in dependence upon the number of output conductors coupled thereto through memory cells (M). If the input signals received exceed a threshold, the recall cell (R) sets the output conductor low, and vice versa. The input signals are summed and stored at the recall cells (R), but decay with time so that after a time a fixed pattern of high and low states appears on the output conductors, and can be sensed by a sensing circuit (90) which enables an output buffer (89).

10 Claims, 19 Drawing Sheets

| $F_0$ KEY VECTOR (HELD FOR 1 CYCLE) | $I_0 * D$ DECAYED INHIBITION | $S_0$ INHIBITORY SIGNAL FROM $F_0$ | $SI_0$ SUMMED INHIBITION | $F_1$ | $SI_1 * D$ DECAYED INHIBITION | $S_1$ INHIBITION SIGNAL FROM $F_1$ | $SI_1$ SUMMED INHIBITION | $F_2$ | $SI_1 * D$ | $S_2$ | $SI_2$ | $F_3$ |
|---|---|---|---|---|---|---|---|---|---|---|---|---|
| 0 | 0 | -3 | -3 | 0 | -1.5 | 0 | -1.5 | 0 | -0.75 | -2 | -2.75 | 0 |
| 1 | 0 | -1 | -1 | 0 | -0.5 | 0 | -0.5 | 1 | -0.25 | 0 | -0.25 | 1 |
| 1 | 0 | -2 | -2 | 0 | -1 | 0 | -1 | 0 | -0.5 | -2 | -2.5 | 0 |
| 1 | 0 | -1 | -1 | 0 | -0.5 | 0 | -0.5 | 1 | -0.25 | 0 | -0.25 | 1 |
| 0 | 0 | -2 | -2 | 0 | -1 | 0 | -1 | 0 | -0.5 | -1 | -1.5 | 0 |

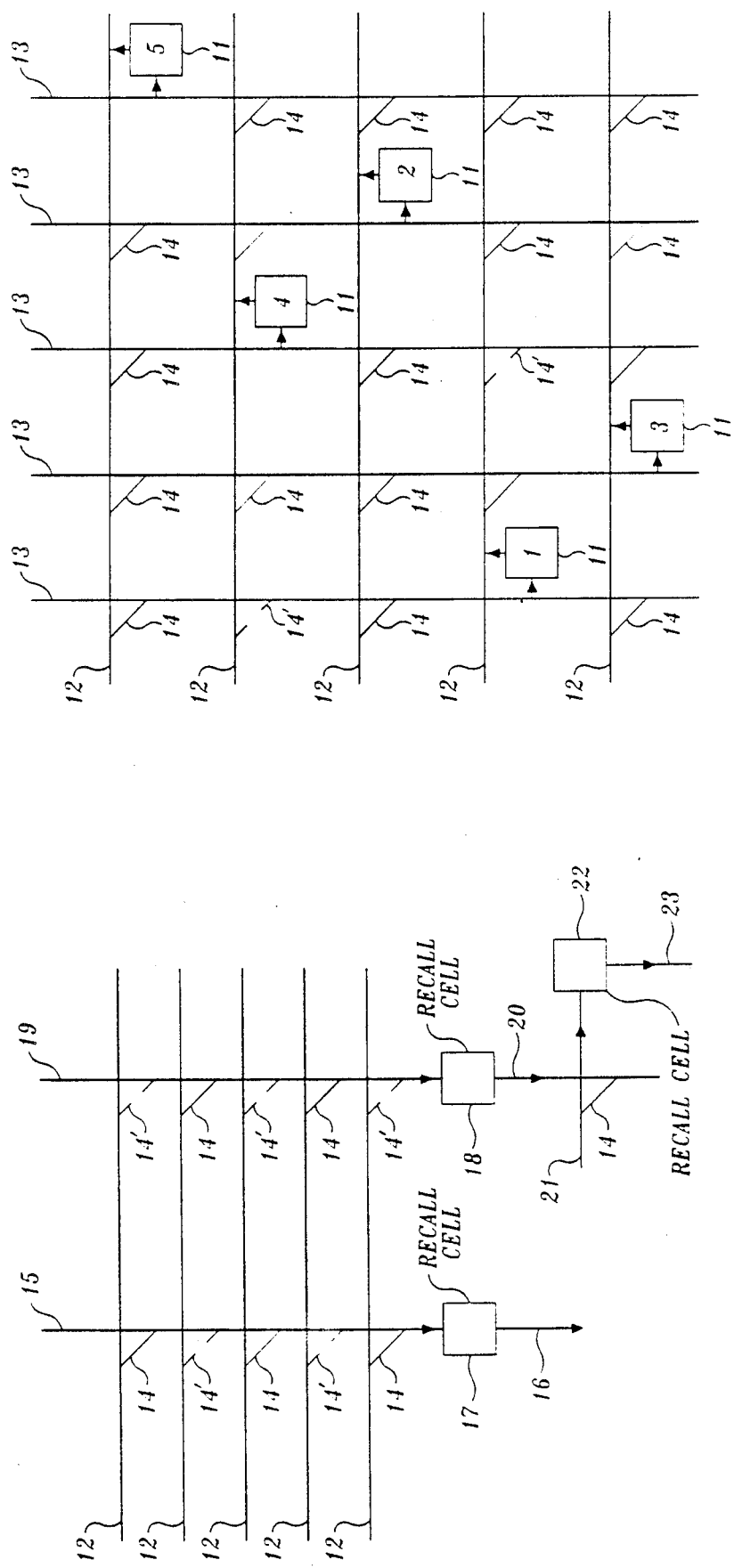

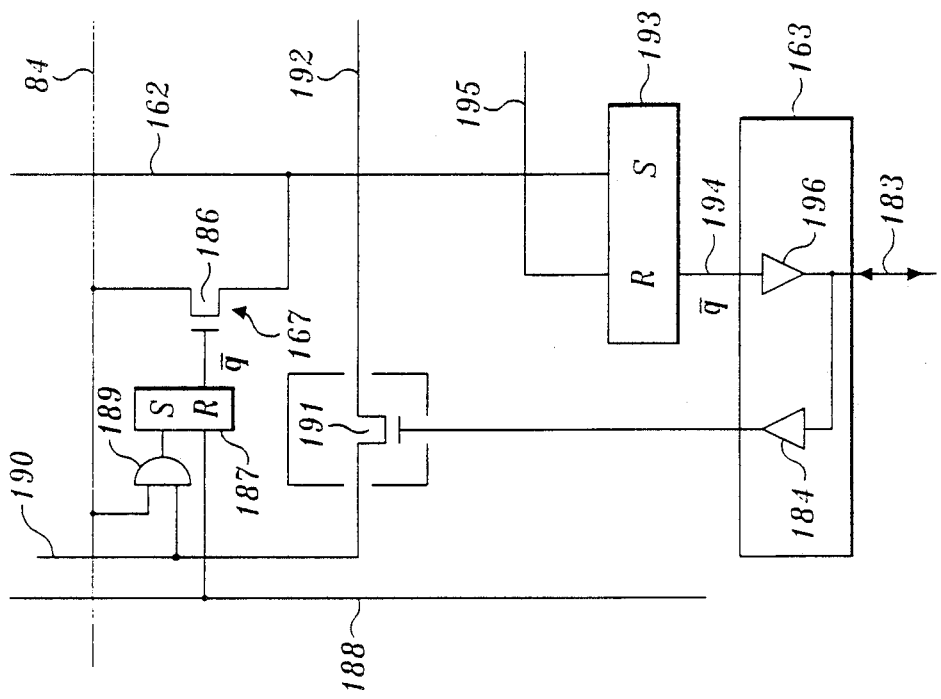
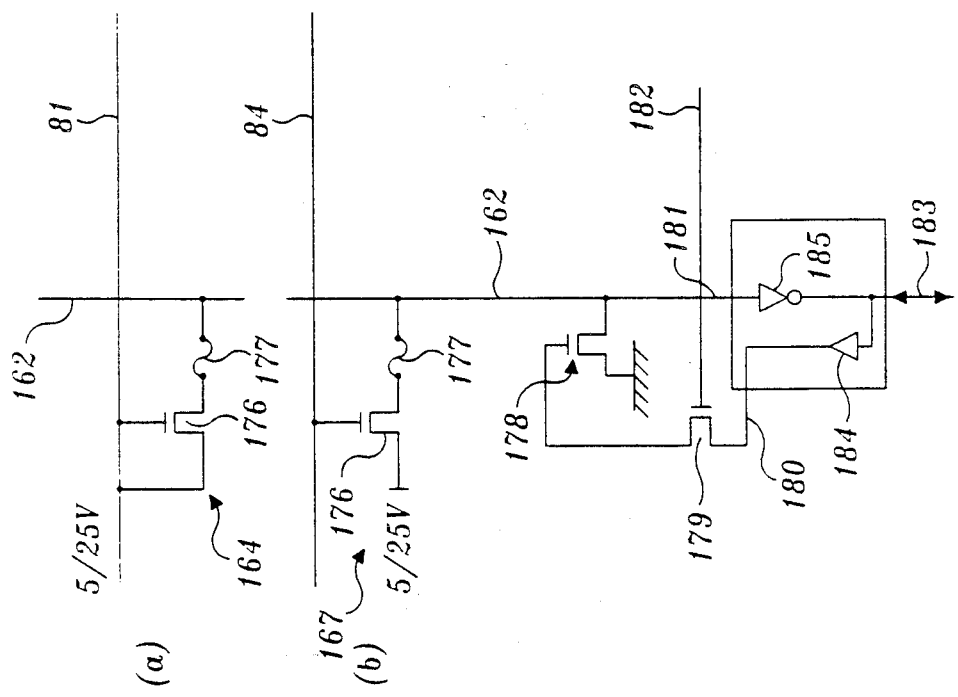
FIG.21.
FIG.20.

| (a) KEY PATTERN | (b) ACCUMULATOR | (c) DISINHIBITION | (d) DISSIPATOR | (e) SIGNAL GENERATOR TARGET PATTERN |
|---|---|---|---|---|
| 1 0 1<br>0 1 0<br>1 0 1 | 2 3 2<br>3 0 3<br>2 3 2 | 2 3 1<br>3 0 3<br>1 3 2 | 1 2 0<br>2 0 2<br>0 2 1 | 0 0 1<br>0 1 0<br>1 0 0 |
| INPUT PATTERN | (SUM OF SIGNALS FROM CELLS IN SAME ROW AND COLUMN, PLUS DISSIPATED SIGNAL FROM t−1) | (SUBTRACT SIGNALS FROM CELLS IN 45/225° DIAGONALS FROM ACCUMULATOR) | (SUBTRACT 1 FROM ACCUMULATOR SIGNAL IN EACH CELL) | (IF ACCUMULATOR SIGNAL=< 0 THEN CELL FIRES) |

*FIG.23.*

RECALL CELL STATES:
1 – 'FIRING': SIGNAL <1
0 – 'NOT-FIRING': SIGNAL >=1
THRESHOLD = 1

ACCUMULATOR SIGNAL
(PREVIOUS SUM *0.5)
+ (SUM OF NON-ADJACENT FIRING
CELLS IN SAME ROW OR COLUMN)
– (SUM OF ADJACENT FIRING CELLS
IN SAME 45-225 DIAGONAL)

ASSOCIATIVE NETWORK AND SIGNAL HANDLING ELEMENT THEREFOR FOR PROCESSING DATA

This invention relates to signal processing, and especially, but not exclusively to pattern recognition and especially to the relaxation and recognition of patterns in digital or analog signals.

Electronic information stores such as Random Access Memories (RAMs), Read Only Memories (ROMs), Programmable ROMs (PROMs) and Electrically Erasable PROMs (EEPROMs), are known in which target information is stored by disconnecting the links of a lattice structure which otherwise connect a series of column conductors with a series of row conductors lying across the column conductors. To access the information thus stored in the memory the rows have to be addressed vertically, and the corresponding output of the columns read according to the pattern of made and broken links. However RAMs, ROMs, PROMs and EEPROMs do not take into account the possibility of noisy or erroneous addressing, and have no facility with which to correct such an inaccurate input address vector.

A paper entitled "A novel associative memory implemented using collective computation" by M. Sivilotti, M. Emerling, and C. Mead at pages 329 to 342 of Proceedings of the Chapel Hill Conference on VLSI, 1985, edited by H. Fuches and published in 1986 by Computer Science Press, contains a discussion of the possibility of a signal processing network that, in response to a 'key' input pattern, provides an output pattern which 'relaxes' with time towards a stable state representing the stored 'target pattern' most similar to, or the best fit' to the key pattern. A complex network circuit is also described.

It is an object of the present invention is to provide a circuit capable of a best fit so-called auto-associative memory function but based on simpler network elements. More generally, the invention is intended to perform relaxation or 'constraint satisfaction' tasks under which key patterns fed into the network are translated into a form consistent with rules and/or constraints programmed into the connectivity of the network by either the manufacturer or the end-user.

According to a first aspect of the invention, there is provided a signal handling element comprising a first signal port, a second signal port, accumulating means and adjusting means, the accumulating means being capable of accumulating signals supplied to the first signal port and the adjusting means being capable of reducing the contents of the accumulating means over a period of time, and means for supplying an output signal to the second port, the arrangement being such that when the contents of the accumulating means are above a certain value, an output signal is not supplied to the second port.

The output signal supply means can be embodied by a signal generator whose operation or output is inhibited when the contents of the accumulating means satisfy the given condition.

The adjusting means may be a dissipator.

According to a second aspect of the invention, there is provided a network comprising a plurality of elements, each element including a first signal port, a second signal port, accumulating means and adjusting means, the accumulating means being capable of accumulating signals supplied to the first signal port, and the adjusting means being capable of altering the contents of the accumulating means over a period of time; and means for supplying an output signal to the second port, the arrangement being such that when the contents of the accumulating means satisfy a given condition, an output signal is not supplied to the second port; the network further comprising a plurality of first signal paths each connected with a first port of a respective element, a plurality of second signal paths each connected with a second port of a respective element and at least one signal coupling means, the or each signal coupling means connecting the second signal path associated with one element with the first signal path associated with at least one other element in the network.

The invention thus provides a network comprising a plurality of elements, each element including accumulating means having a first port, a second port, dissipating means for dissipating an accumulated signal derived by the accumulating means from signals received through the first port, and means for supplying an output signal, related to the dissipated signal, to the second port, the network further comprising a plurality of first signal paths each connected with a first port of a respective element, a plurality of second signal paths each connected with a second port of a respective element and at least one signal coupling means, the or each signal coupling means connecting the second signal path associated with one element with the first signal path associated with at least one other element in the network.

The accumulating means may be operable to produce a signal on the second signal path which is in inverse relation to the contents of the accumulating means.

Each element may include threshold means which are operable to inhibit the output signal from the element when the magnitude of the accumulated signal exceeds a threshold level. However, it is not essential for the operation of the element to be threshold based. A more gradual cut-off will in many cases be appropriate; so each accumulating means may comprise capacitive means and each adjusting means may comprise resistive means in parallel with a corresponding one of the capacitive means.

The accumulating means may include pulse counting means and, alternatively or in addition, a shift register.

Each signal coupling means may be degradable, either partially or wholly (in which case the signal coupling means will effectively be disconnectable). Although a network in which the signal coupling means have various different gains is within the scope of the invention, it will often be preferable, if only for ease of manufacture, for the degraded signal coupling means to be of the same gain as each other and for the nondegraded signal coupling means to be of the same gain as each other. It is preferred that degraded signal coupling means be reinstatable.

Although degradation of the coupling means may be achieved in any appropriate way, each signal coupling means may be degradable by means of a signal applied through the signal coupling means, for example, from the second signal path. In a preferred embodiment, a signal coupling means between two elements is degradable by means of signals applied contemporaneously to the second signal paths of both elements in conjunction with a control signal.

Each signal coupling means may comprise a diode which conducts signals from the second signal path associated with a corresponding element to the first signal path of at least one other element.

Preferably each element also includes a third port and the arrangement is such that when an output signal from a different element is supplied (e.g. through a third signal path) to the third port, the alteration (e.g. dissipation) of the contents of the accumulating means is accelerated. The third signal path of each element may be connected to the second signal path of at least one of the other elements in the network.

In further aspects of the invention, the network is included in a filter circuit, pattern recognition apparatus or memory apparatus.

Thus, the basic invention is embodied in a set of signal generating cells or elements interconnected by a matrix of signal conducting paths and each communicating signals to and from outside the network. In operation, each cell receives a signal representing the value of one component of a key pattern vector fed into the net, and, after relaxation, each cell generates a signal representing the value of the corresponding component of the target pattern vector. The target vector components are binary numbers, with the zeros represented by cells which are not signalling and the ones by cells that are signalling. The key vector components may be binary numbers, but may also be integers or 'real' positive values e.g. 5, 2.4, 0.6, 1, 0.

The invention can be put into practice in several ways, some of which will now be described by way of example with reference to the accompanying drawings in which:

FIG. 1a) is a schematic diagram of a single element according to the invention;

FIG. 1b) is a schematic diagram of an alternative embodiment of an element according to the invention;

FIG. 6 is a schematic diagram of a hetero-associative network according to the invention connected with part of an auto-associative network according to the invention;

Figure 8:
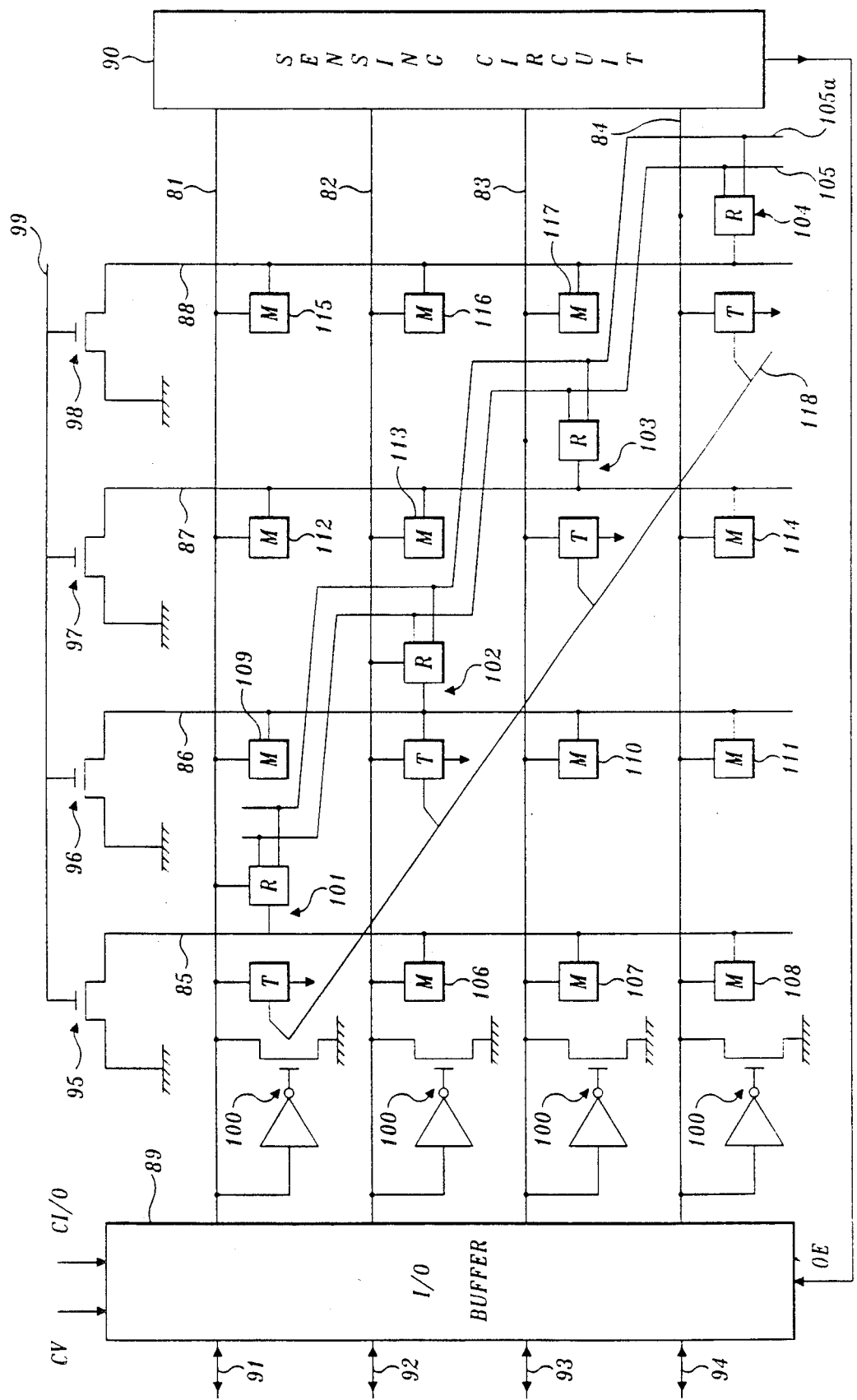
Figure 15:
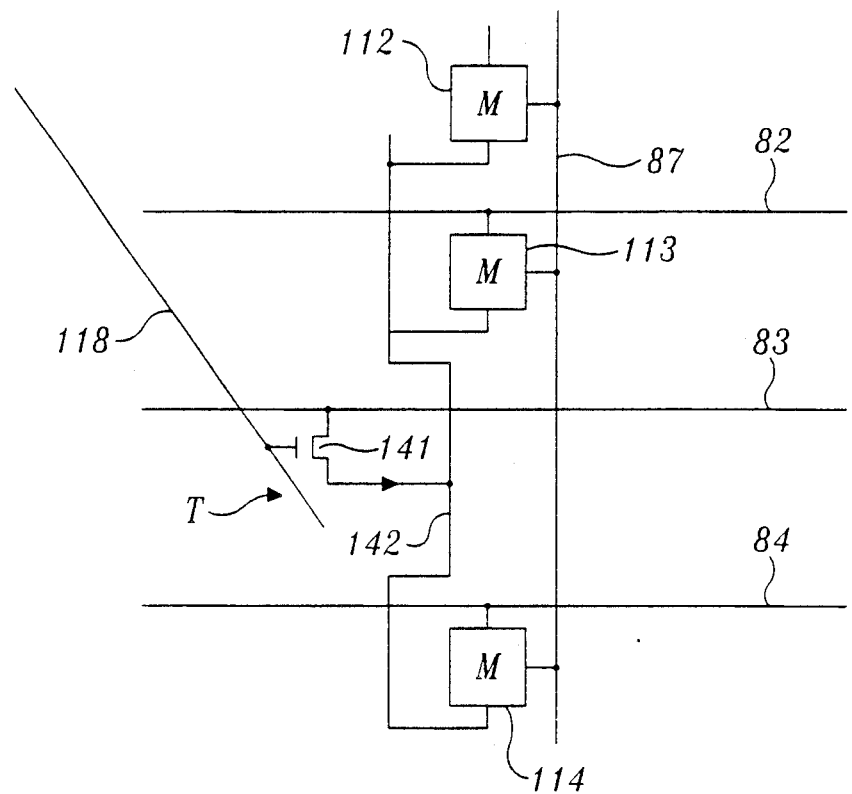
Figure 16:
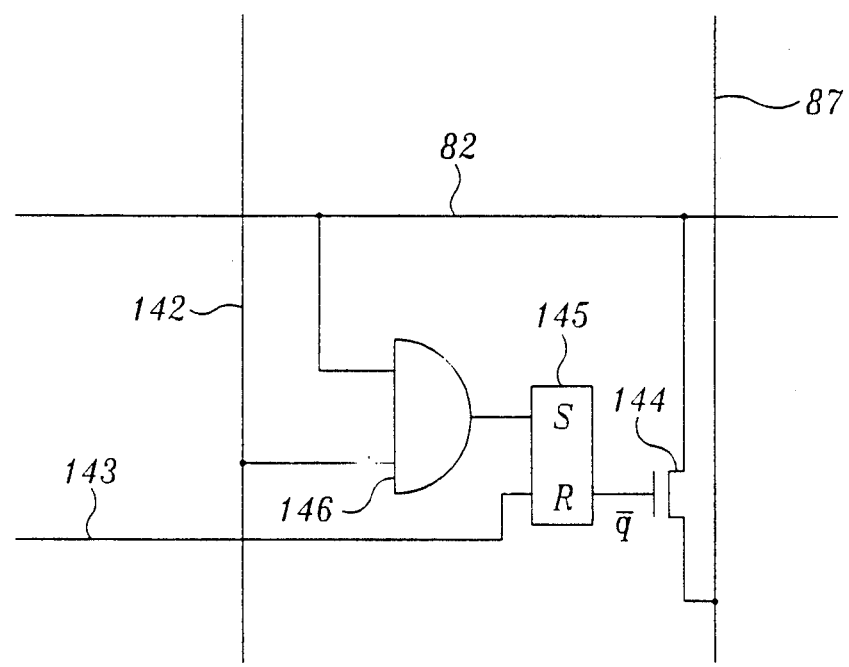
Figures 17, 18:
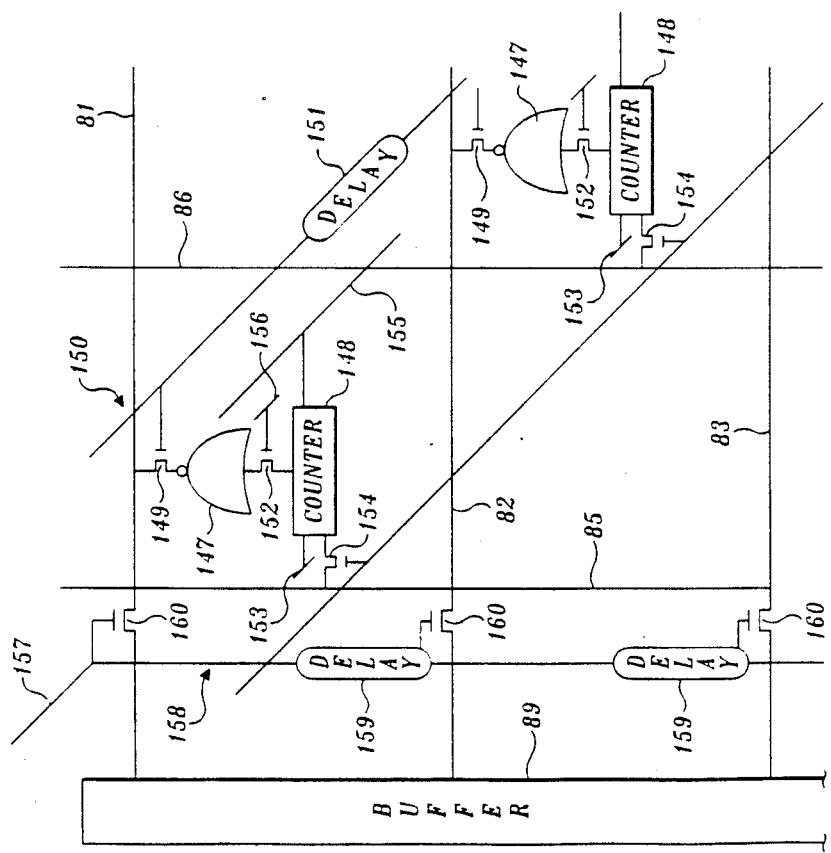
Figure 19:
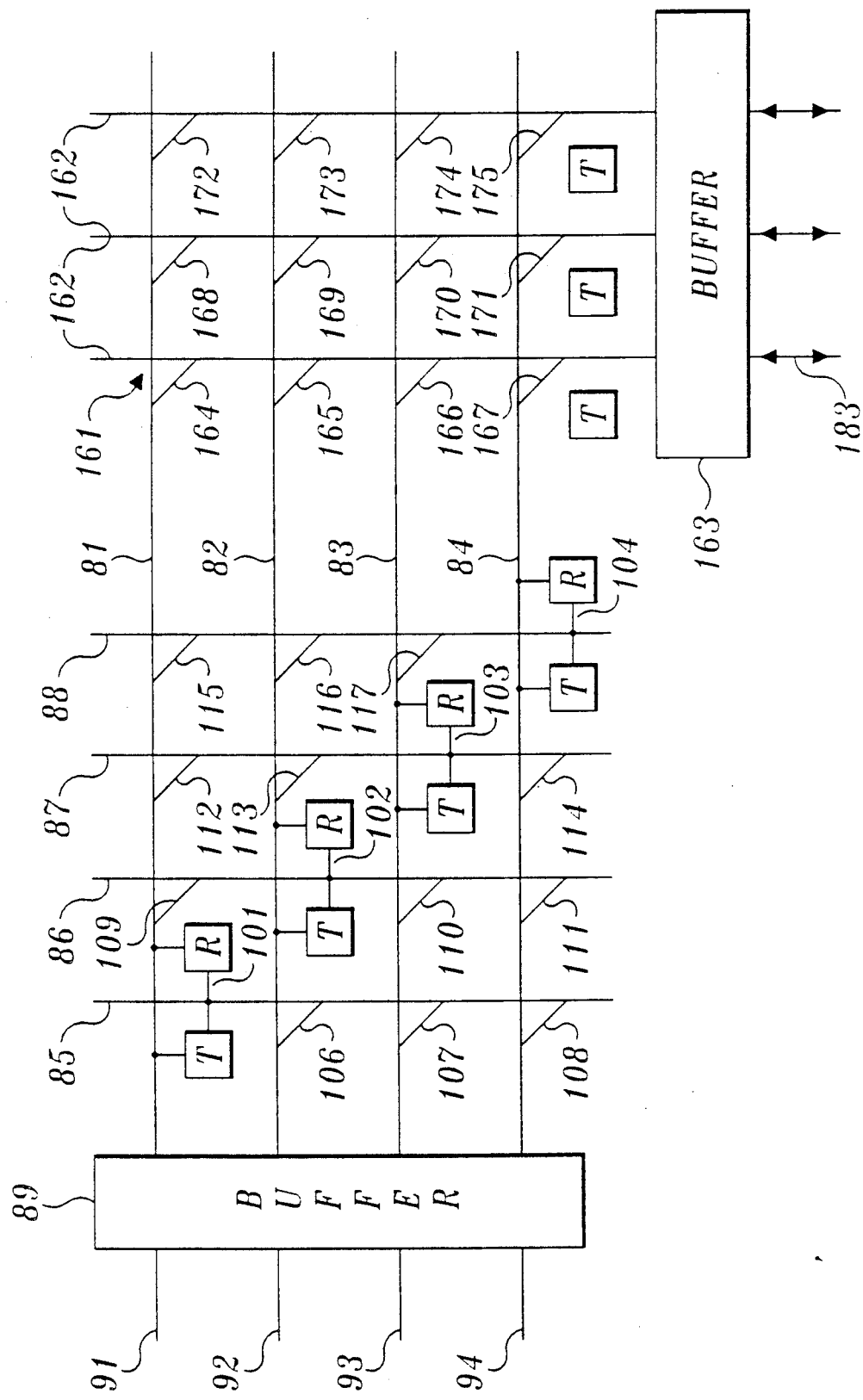
Figure 22:
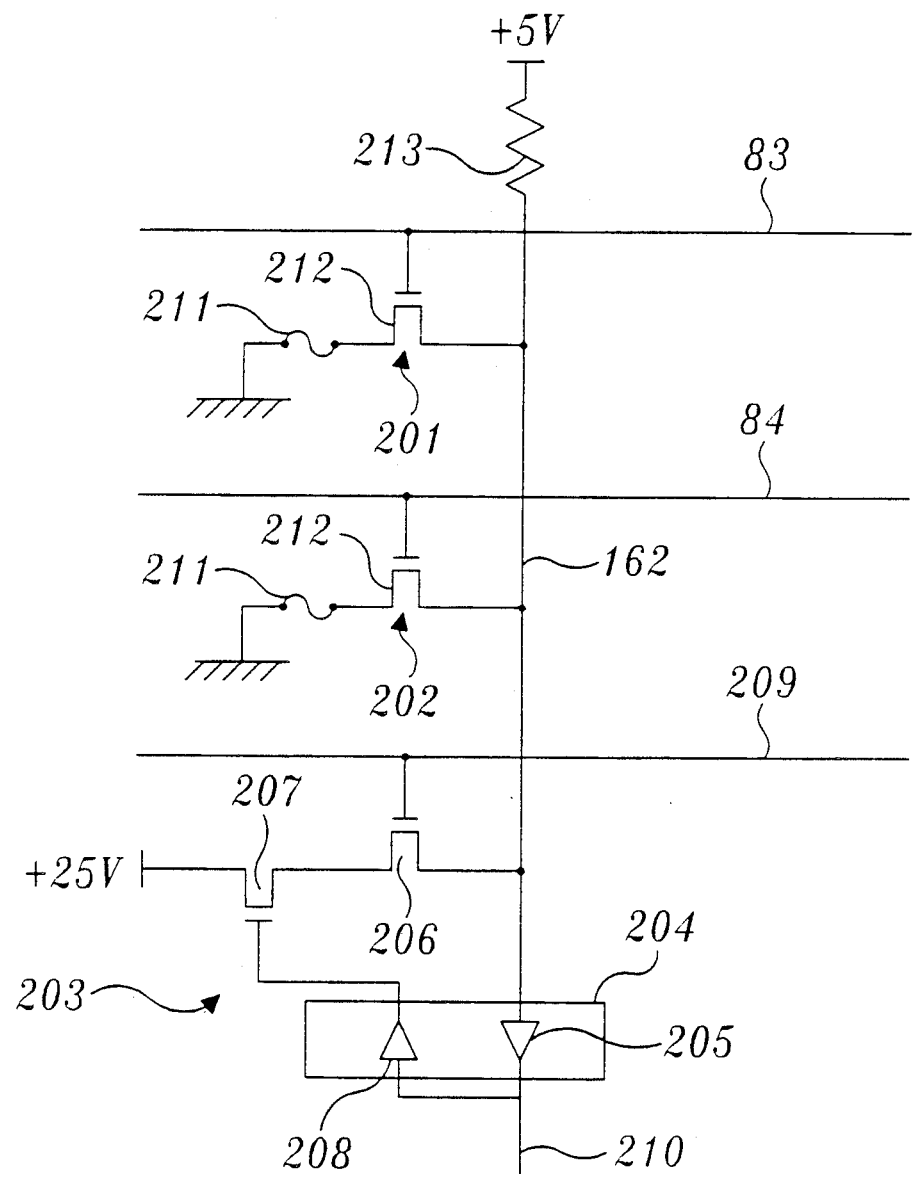
Figure 24:
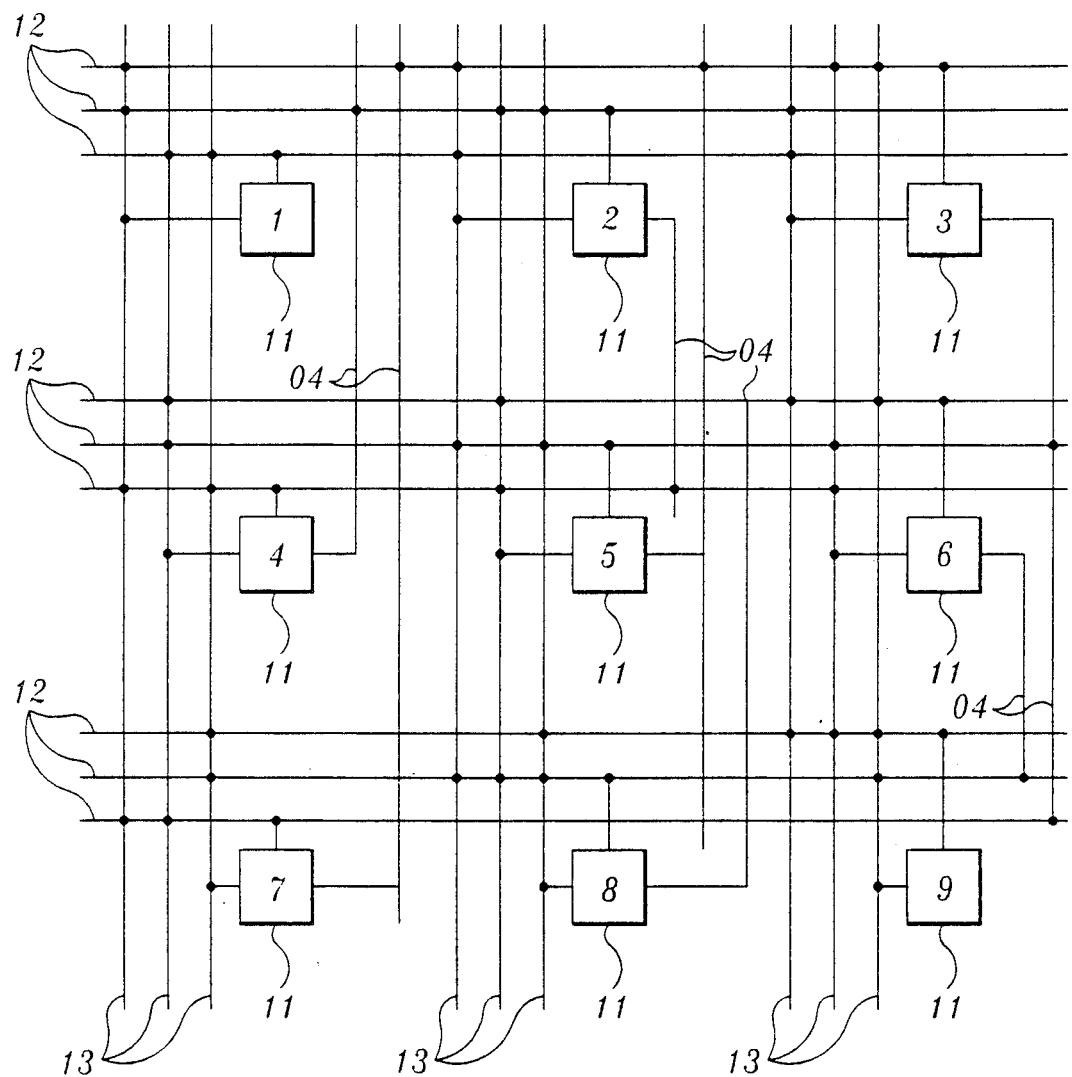
Figure 25:
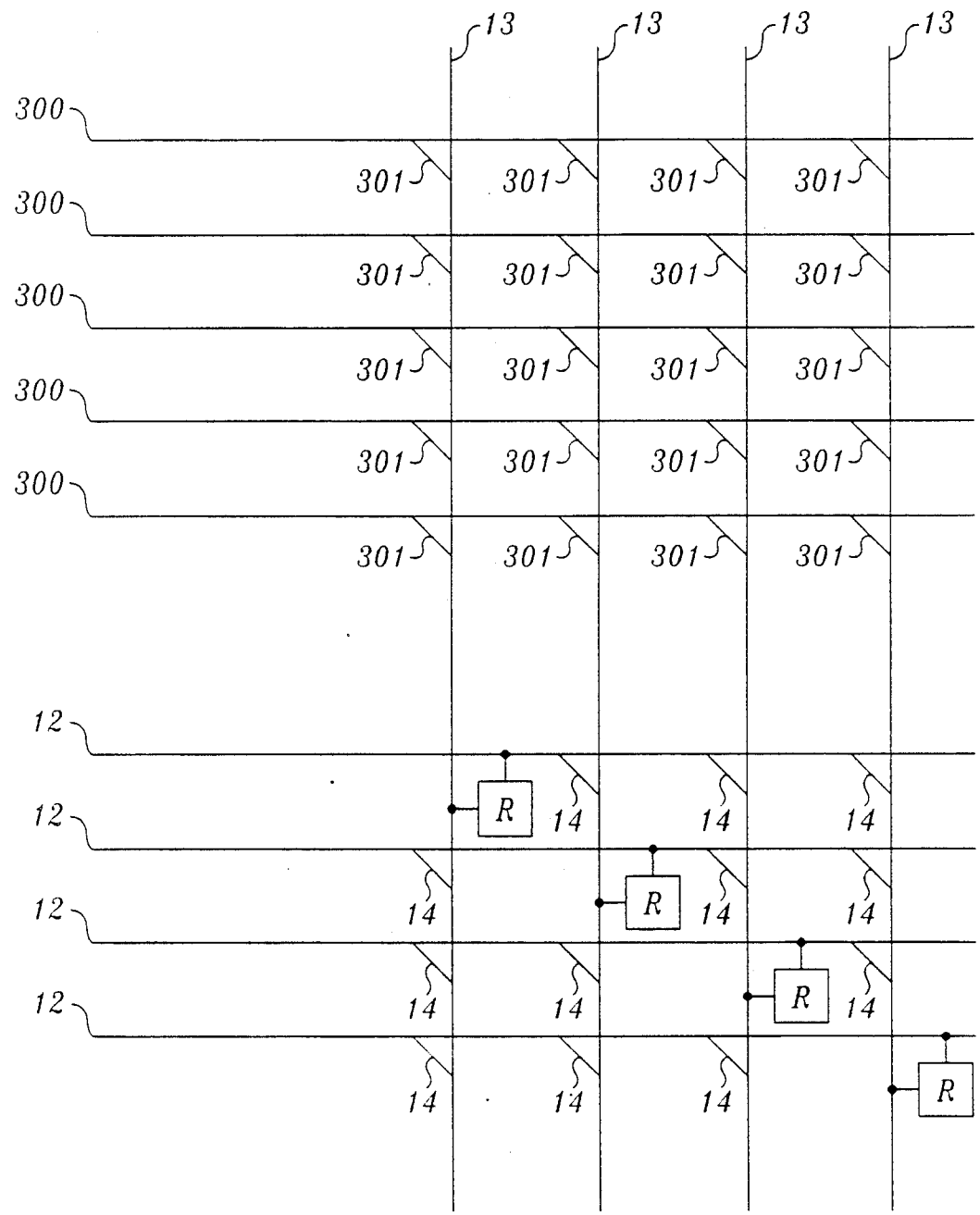

FIGS. 7a), 7b) and 7c) illustrate schematically alternative embodiments of networks according to the invention;

FIG. 8 is a schematic diagram in block form of an apparatus embodying a network according to the invention;

FIGS. 9 to 14 are circuit diagrams of parts of the apparatus of FIG. 8 and alternatives thereto;

FIGS. 15 and 16 are circuit diagrams of parts of the apparatus of FIG. 8 using logic circuits;

FIG. 17 is a circuit diagram of a logic circuit implementation of part of a network according to the invention which is a modification of the network of FIG. 8;

FIG. 18 is a table illustrating operation of a network according to FIG. 17;

FIG. 19 is a schematic block diagram of pattern recognition apparatus embodying the invention;

FIGS. 20 to 22 are circuit diagrams of alternative implementations of parts of the apparatus of FIG. 19;

FIG. 23 is a table illustrating the sequence of operation of a constraint satisfaction network according to the invention;

FIG. 24 is a schematic diagram of a constraint satisfaction network according to the invention;

FIG. 25 is a schematic diagram of a hetero-autoassociative network according to the invention; and FIGS. 26 a), b) and c) are diagrams showing how noisy patterns generated by a stereopsis algorithm can be relaxed by a network according to the invention.

Figure 1B:
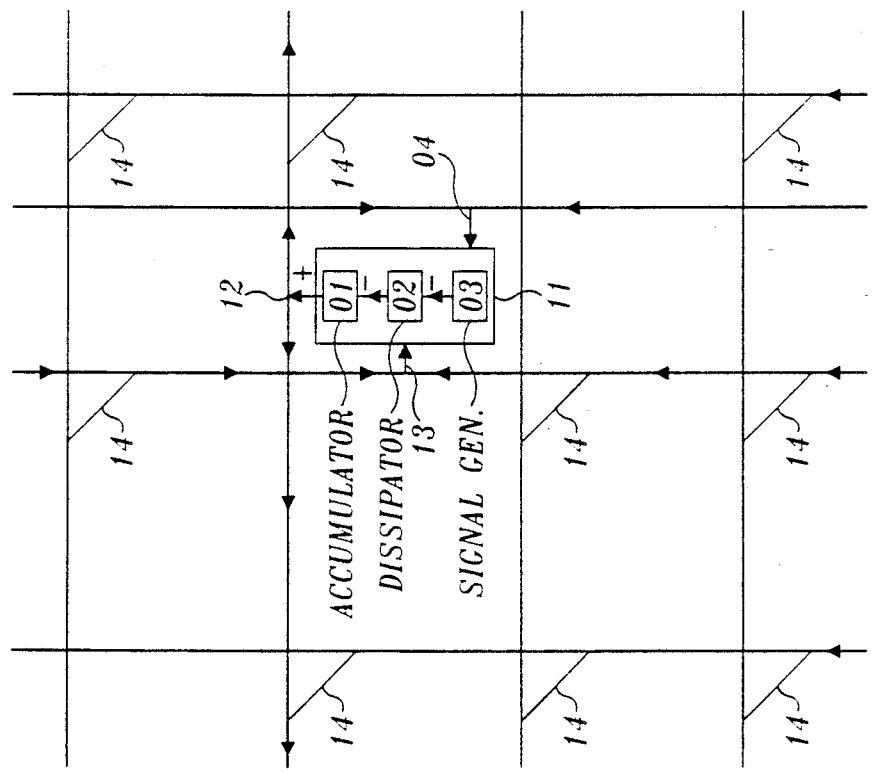
Figure 1A:
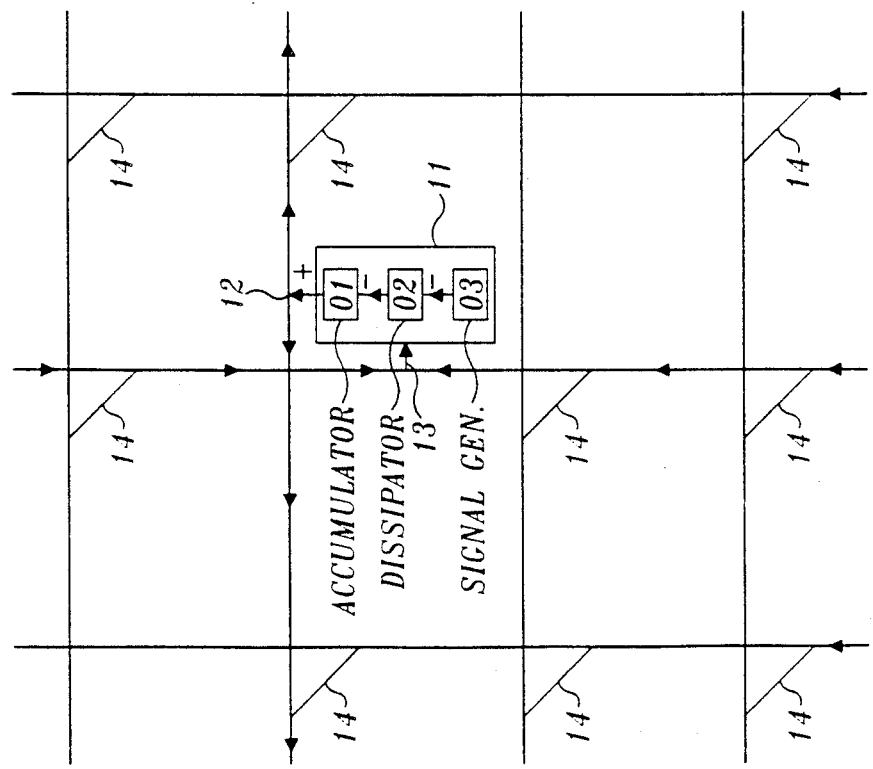

Turning now to the drawings, FIG. 1a) is a schematic representation of part of a network of these simple elements. Each element consists of a recall cell 11, with two signal transmission paths referred to hereinafter as the axon or axonic conductor 12, and the dendrite or dendritic conductor 13. For simplicity, the axons are represented as horizontal signal paths and the dendrites as vertical signal paths in FIG. 1a)—and subsequent Figures. The remainder of the network is composed of elements of identical form to the element shown in FIG. 1a). The arrangement is such that the axons and dendrites form a matrix or square net and the recall cells may be disposed along one diagonal of the net, although this is not essential. Between the axon of each recall cell and the dendrite of each other recall cell there are potential signal paths through matrix connector links 14, so that each recall cell, can potentially receive signals from all recall cells via its dendritic conductor.

The relaxation or constraint satisfaction function performed by the net depends upon the pattern of connections in the matrix connector links. These links can only transmit signals from axonic conductors to dendritic conductors. Information can be stored in these links by varying their ability to transmit signals. Although intermediate link gains may be valuable for some tasks, an important range of functions can be performed with links capable of either full transmission of a signal, or no transmission at all. The respective states of a link for full transmission and no transmission are referred to hereinafter as the 'made' or 'operative' and 'broken' or 'inoperative' states respectively.

The recall cell 11 consists of an accumulator 01, a dissipator 02, and a signal generator 03.

The accumulator 01 sums signals from its dendrite according to a summing function. It may add signals linearly, or it may compress the representation of higher values of accumulated signal with a logarithmic or power function. The accumulator would normally have a maximum limiting value above which further incoming signals are not registered as an increase in accumulated signal, and there may also be a minimum value, which may be negative, or below which the accumulated signal automatically drops to zero.

The dissipator 02 reduces the accumulated signal as a function of time according to a decay function. The accumulated signal may simply be allowed to drain away by a continuous analogue process, with the rate of signal loss proportional to the level of accumulated signal. Alternatively, the accumulated signal may be multiplied by a positive number less than one at regular intervals. In both cases, the level of accumulated signal falls exponentially with time. It may be sufficient simply to subtract a constant amount from the accumulated signal at regular intervals, or a combination of subtraction and multiplication may be more appropriate in some circumstances.

The signal generator 03 produces a signal on the axonic conductor which varies as an inverse, or inhibitory, function of the signal registered in the accumulator. Typically, this signal has an upper limit or maximal value when the accumulated signal is zero. As the accumulated signal rises above zero, it tends to inhibit or reduce the axonic signal. This is achieved either by simply subtracting the accumulated signal linearly from the axonic signal, or by dividing the axonic signal by the accumulated signals when they are above a certain value, or by a combination of subtraction and division.

When the accumulated signal exceeds a threshold amount, the axonic signal falls to zero or close to zero. Alternatively, the axonic signal may be a step function of the accumulated signal, remaining at its maximal value as the accumulated signal increases from zero to a threshold level at and above which the axonic signal becomes zero.

The threshold level of accumulated signal which is sufficient completely to inhibit the axonic signal of a recall cell depends on circumstances. The axonic signal from a single recall cell may be sufficient to exceed the threshold of all recall cells to which it is linked, either immediately, or after a significant period of time summating in the accumulator. Alternatively the signal from a single recall cell may be insufficient to summate to threshold level.

Figure 3:
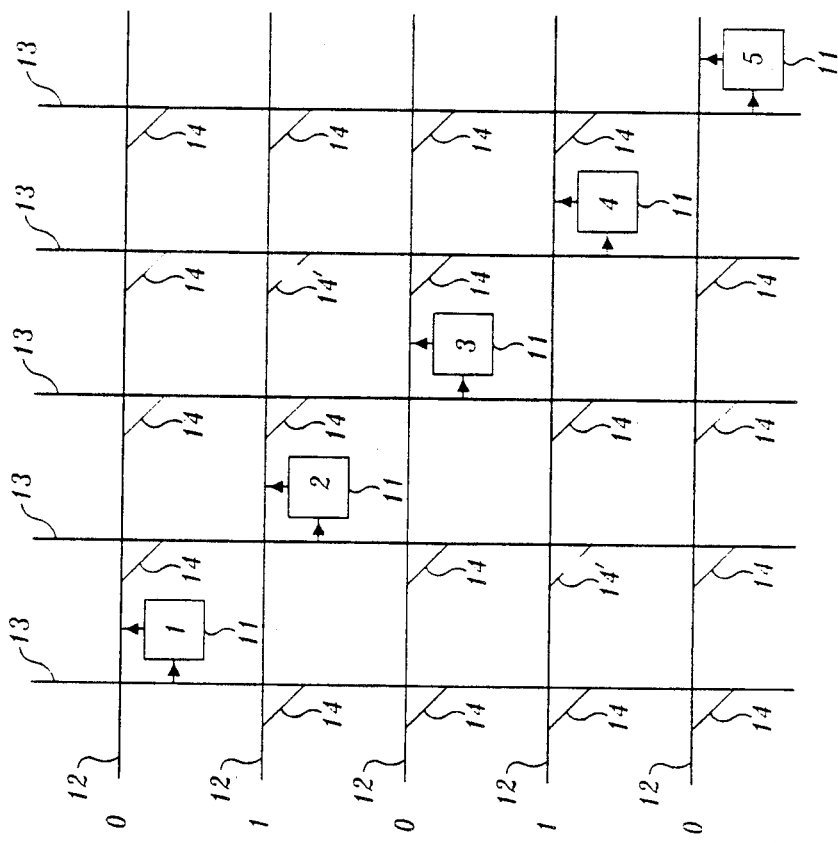
FIG. 3 is a schematic diagram illustrating the network of FIG. 2 programmed to perform peak-value selection.
Figure 2:
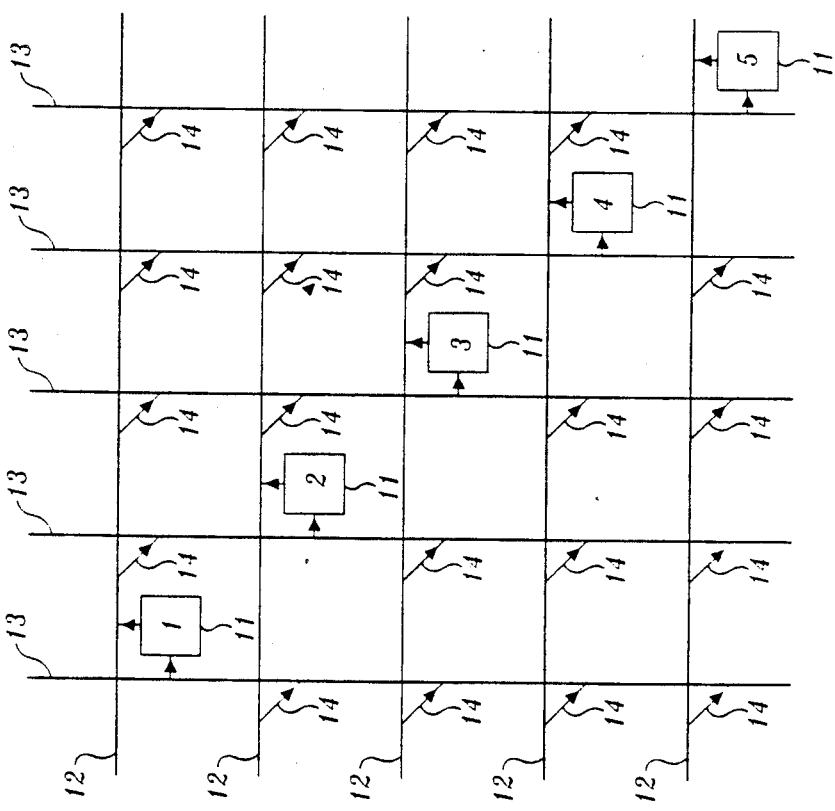
FIG. 2 is a schematic diagram of a network according to the invention, comprising a plurality of elements according to FIG. 1.
Figures 4, 5:
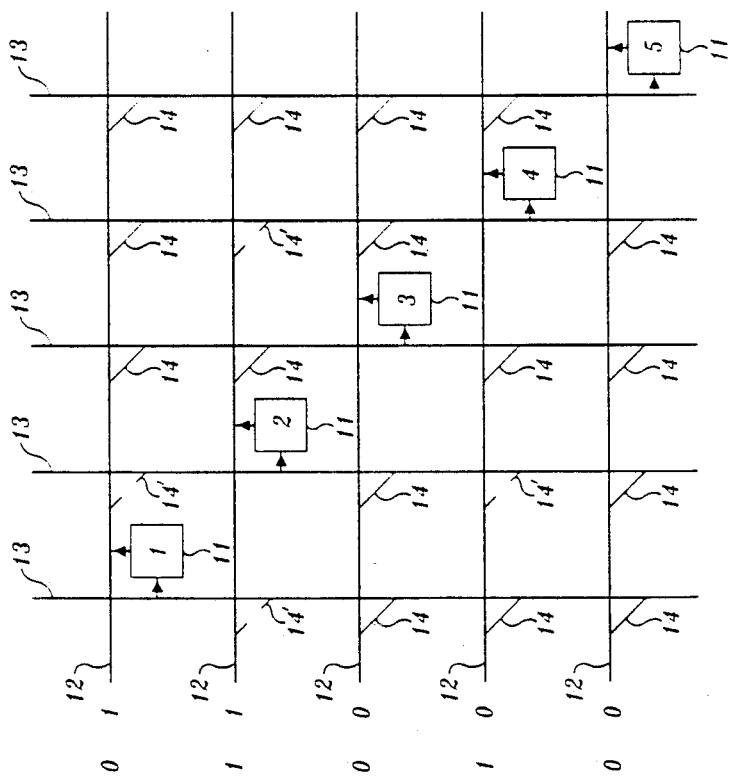
FIG. 4 is a schematic diagram illustrating the network of FIG. 2 after two target vectors have been stored.
FIG. 5 is a table of the sequence of operation of a digital network according to the present invention.

FIGS. 2 to 4 are schematic representations of a network of recall cells in accordance with the invention. The following functions implemented by the recall cell components have been selected to be as simple as possible.

The inhibition function is a threshold function, so that the cell is either signalling or not signalling during any time interval. This signal consists of pulses emitted at a rate of one pulse per time interval. Recall cell thresholds are set at one pulse only, so that a recall cell with a signal level of one pulse or more in its accumulator emits no axonic signal pulses during the subsequent time interval. The decay function may be either subtractive or multiplicative. The simplest subtractive decay function reduces the accumulator signal by 1 during a temporal interval, and the simplest multiplicative decay function multiplies the accumulator signal by half during each such interval. The simplest accumulator function is linear addition, so that the accumulator sums the number of pulses received during each temporal interval and adds this to the dissipated inhibition from the previous interval.

Recall cells and axons emitting or conducting axonic signals are referred to as 'excited', 'signalling' or 'firing', and recall cells emitting no axonic signal are referred to as 'inhibited', 'not-signalling' or 'not-firing'. As all signals are inhibitory, signals are also referred to as 'inhibition'.

In FIG. 2, five recall cells are shown and, for convenience of reference, are numbered 1 to 5. If all matrix conductor links are in the made state, including those between axon and dendrite of the same element, then all activity in the network would be self-inhibiting. The more cells that fire at any moment, the more inhibited they would all be at the subsequent moment, and the longer they would take to recover from this self-inhibition. All cells would be equally inhibited by any stimulus and so would recover and fire synchronously at a frequency determined by the number of cells in the network and the decay function.

In FIG. 3, however, all matrix connector links between axons and dendrites of the same element are broken. This means that the only stable target vectors are those in which only one element is firing. In this network, the element with the greatest key vector component coupled to its axonic conductor receives less inhibition than the other recall cells, and so recovers from this inhibition sooner and inhibits the other elements before they can return this inhibition. Thus, the network returns the target vector in which only the element representing the greatest key vector component is signalling.

For example, if the vector 1,0,0,0,0, is presented to the network so that the axon 12 of recall cell 1 receives one signal pulse while the axons of the other recall cells receive no pulses, for one time interval, then each of the dendrites and accumulators of recall cells 2 to 5 will receive and register the signal of one pulse from the axon of recall cell 1. This is sufficient to inhibit the firing of their signal generators, so that the axons 12 of the recall cells 2 to 5 will not be excited during the second time interval, i.e. that following the presentation of the input pattern. However, the dendrite 13 and acumulator 01 of recall cell 1 receive no signals during the first time interval so that the signal generator 03 fires and emits a single pulse during the second time interval.

If the decay function is subtractive, then during the the second time interval the dissipators of recall cells 2 to 5 will subtract one pulse from the accumulated signals leaving signals of 0 in the accumulators; however each accumulator in recall cells 2 to 5 will also receive and add the pulse emitted by recall cell 1 during the second interval. This will leave a total signal of strength 1 in each accumulator of recall cells 2 to 5 at the end of the second interval, so that they will fail to fire during the third interval. However, at the end of the second time interval recall cell 1 has still received no signals and so generates another pulse during the third interval. In this way the vector 1,0,0,0,0, is maintained in the network indefinitely.

If the decay function is multiplicative, then during the the second time interval the dissipators of recall cells 2 to 5 will decay the accumulated signals of strength 1 by multiplying them by 0.5, leaving signals of strength 0.5 in the accumulators; however, each accumulator will also receive and add the pulse emitted by recall cell 1 during the second interval. This would leave a total signal of 1.5 in each accumulator of recall cells 2 to 5 at the end of the second interval, so that they will fail to fire during the third interval. However, at the end of the second time interval recall cell 1 has still received no signals and so generates another pulse. At the end of the third time interval, recall cells 2 to 5 will each have accumulated inhibitory signal strength of $-[1+0.5+0.25]$ while recall cell 1 will have accumulated no inhibitory signal. In general, after n time intervals, each of the recall cells 2 to 5 will have accumulated an inhibiting signal strength of $-[1+0.5+0.25+ \ldots +[0.5]^n]$, which in the limit is $-2$.

Thus, for both subtractive and multiplication decay functions, the network remains in a stable state in which recall cell 1 is excited and recall cells 2 to 5 are inhibited, thereby returning the target vector 1,0,0,0,0, for the key vector 1,0,0,0,0, and indicating the element representing the key vector component with the greatest signal.

The net can also perform this peak value selection function on non-digital input patterns. Consider the sequence of events which would follow if vector components 1,2,5,3,1, were coupled to the axons of recall cells 1 to 5 respectively. In this example, it is assumed that the value of the vector component represents the number of pulses applied to the corresponding axon during the first time interval; the axon of recall cell 2 would receive 2 pulses during the first time interval, the axon of recall cell 3 would receive 5 pulses, and so on. It is also assumed that the pulses are sufficiently separated in time to be registered individually by the accumulators of the other recall cells, so that each cell's accumulated signal is equal to the sum of the signals on the axons of the other four cells. At the end of the first interval, the signals registered in the accumulators of cells 1 to 5 are 11,10,7,9,11 respectively. These signals can then be dissipated or decayed according to the subtractive or multiplicative decay functions described above until the recall cell with the lowest signal (cell 3) falls below threshold, releasing its signal generator to emit signal pulses which maintain inhibition of the other recall cells indefinitely. Thus the key vector 1,2,5,3,1, would be translated into the target vector 0,0,1,0,0.

Note that the recall cell that receives the highest input signal on its axonic conductor receives the lowest signal on its dendrite conductor and so accumulates the lowest signal in its accumulator and falls below threshold before the other cells. It follows that if the net is required to find the recall cell receiving the least signal in a pattern vector, the vector should be applied to the dendrite conductors rather than the axons. This example thus also demonstrates the response of the network were the key vector components 11,10,7,9,11, to be coupled to the dendrites of cells 1 to 5 respectively. Thus the net can perform the peak value selection function of finding the recall cell receiving either the highest signal on its axons or the lowest signal on its dendrites. In some circumstances a continuous decay function would have the advantage of minimising the probability that two or more recall cells might reach the threshold level simultaneously. Recall cells implementing a continuous decay function are described below in relation to FIG. 13.

To perform its auto-associative memory function, the network must be taught or programmed with a set of binary 'target vectors'. Programming the network with target vectors involves decrementing the matrix connectors between the excited cells in the same vector. This decrementing process may diminish the signal conducting capacity of a link partially or completely. In the simplest case, the matrix conductor is completely broken, and this will be assumed in the following examples. The net can be programmed during manufacture like a ROM, with links being specified as present or absent. Alternatively, the net may be user-programmable, like a PROM, or user-reprogrammable like an EPROM or RAM. The programming process requires a special 'Teach' phase and 'Teach' cells and circuits to selectively modify links between excited cells in the same target vector during the teach phase. In either case, the same links are modified and the auto-associative recall process is essentially the same. In user-programmable networks, each element must also incorporate a teach cell.

During the recall process, when the network is presented with any input or 'key' vector, it 'relaxes' into the target vector which is least dissimilar to that key vector. This is because the strengths of inhibiting signal received by the signalling cells in a target vector pattern are a measure of the dissimilarity between an applied key vector and the particular target vector. Where a network has been programmed with two or more target vector patterns, the signalling cells in the target vector least dissimilar to an applied key vector will receive least inhibition and so tend to recover from inhibition first. Thus, the network translates a degree of difference, or separation in Hamming space, into separation in time. Different target vectors are mutually inhibitory, so that the first to emerge in a recall phase prevents the release of all other target vector patterns. Thus, the network recalls the target vector most similar to an applied key vector. Note that, by analogy with the peak value selection nets described earlier, if the key vector pattern is presented on the dendritic conductors, instead of the axons, then the net will 'relax into' the stored target pattern most dissimilar to the key pattern.

FIG. 4 represents the condition of the network of FIG. 2 immediately after being programmed with two target vectors, 0,1,0,1,0 and 1,1,0,0,0. The matrix links between elements 2 and 4 are broken in response to the target vector 0,1,0,1,0, and the links between elements 2 and 1 are broken by the target vector 1,1,0,0,0. Broken links are indicated by 14'.

If either of these target vectors is applied to the network of FIG. 4, the two signalling elements receive no inhibiting signals, and remain firing, while the other three elements receive inhibiting signals of strength 1 or 2, and remain inhibited. FIGS. 5 and 18 are tables representing successive stages in the recall process when a key vector 0,1,1,1,0 is applied to the network of FIG. 4. FIG. 5 represents the consequence of using a multiplicative decay function under which the accumulated signal decays by a factor of $D=0.5$ per time interval. FIG. 18 represents the consequence of using a subtractive decay function under which the accumulated signal is decreased by $N=1$ pulse per time interval. The initial application of this key vector is represented by the top row in FIGS. 5 and 18 which reads 0,1,1,1,0 Fo Key Vector [held for 1 cycle]. The cycle or time interval referred to is one unit of time in the operation of the recall phase.

The second rows in FIGS. 5 and 18 represent the decayed accumulator signals during the second cycle. There is no initial total inhibition $Io=0$ and $Io*D=0$ for each recall cell, because the accumulators are assumed to have been cleared before the presentation of the key vector. The axonic conductors of recall cells 2, 3 and 4 are excited as a result of Of and the inhibiting signal strengths So received as a result at recall cells 1 to 5 are represented by the third row. Row four represents the sum SIo of the decayed inhibition plus the signals received from the key vector So, and row five represents the resultant pattern of firing F1 of the recall cells 1 to 5, i.e., no firing. Row six represents the decayed inhibition one cycle after the key vector. The inhibiting signal S1 strength received from F1 is in each case 0 (row 7). The recall cells have thresholds of 1 so that accumulated signals of 0 or 0.5 allow recall cells to fire. In both FIGS. 5 and 18, row 8 shows that recall cells 2 and 4 both have subthreshold levels of accumulated signal SI1 and can therefore fire in F2, and establish the vector 0,1,0,1,0 as a stable pattern of activity in the array. Thus, the target vector which has more active elements in common with the key vector is recalled, and both subtractive and multiplicative decay functions can be used to this end.

In the examples of the network described, there are two main phases of operation, the teach and recall phases, both of which involve loading a vector from the input/output buffer onto the axons and then enabling the appropriate teach or recall cells. The objective of the teach phase is to make all links between simultaneously firing target vector elements inoperative. The objective of the recall phase is to use the information stored in this way to recall the target vector which is the best fit to any key vector presented.

The operation of the model network can be summarised by the following:

1) the axons of all elements are spontaneously active unless inhibited.

2) the matrix links are initially all operative and inhibitory. When its axon is not active, an operative link transmits no signals. However, when its axon is active, each operative link transmits a signal to its dendrite.

3) information is stored by diminishing the signal transmitting ability of these links, for example, by rendering them 'inoperative' and unable to transmit signals.

4) the dendrite collects the inhibitory signals and transmits them to the recall cell where they are summed over time and stored in the accumulator.

5) the stored summed inhibitory signals reduce the activity of the signal generator and may, for example, totally inhibit its activity if the accumulated signal exceeds a certain threshold.

6) the summed inhibitory signals stored in the accumulator also decay or dissipate with time. Thus, for example, a signal which exceeds threshold and totally inhibits axon activation, will eventually fall below threshold and release axonic signals if no further signals are received by the dendrite.

7) the strength of axonic signal, the gains of the operative links, the magnitiude of inhibitory signals, and decay rate are set at values sufficient to ensure that an element receiving continuous signals from only one or a few other elements will become and remain inhibited, and be unable to activate its axon.

8) the decay of the summed inhibiton may be achieved by multiplying it by a decay factor between 0 and 1 ($D>0$, $D<1$). However, the net can also operate if the decay is by subtraction of a fixed amount from the summed inhibiton at intervals. The decay process of choice, multiplicative or subtractive, varies with circumstances, and a decay function combining both operations may also be the best option.

Figure 7B:
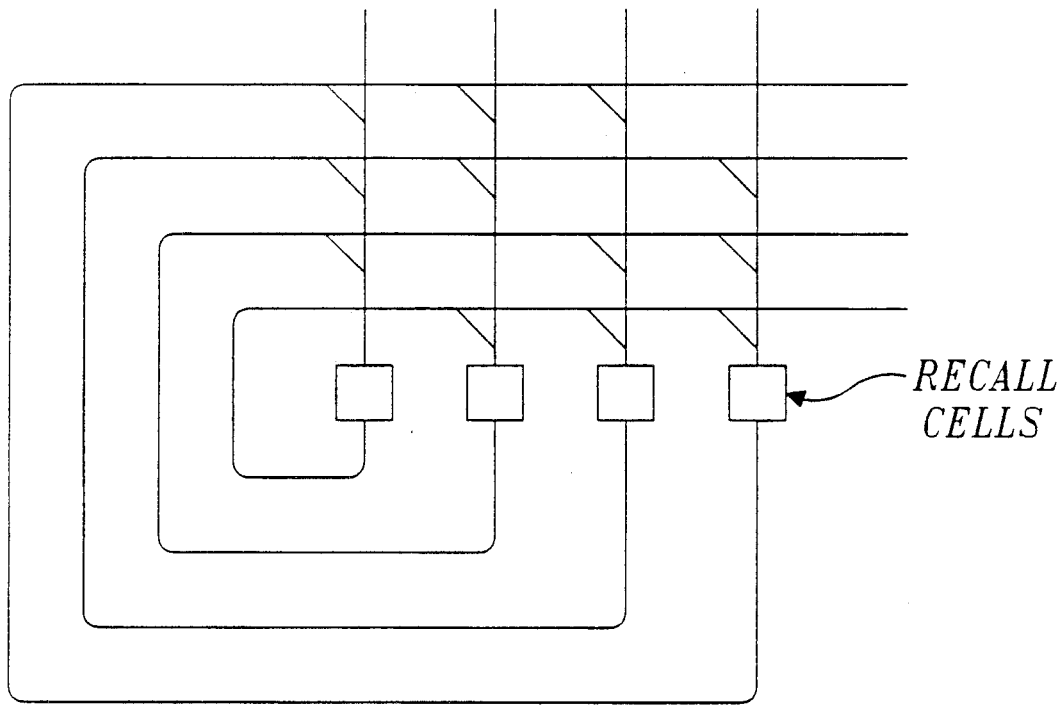
Figure 7C:
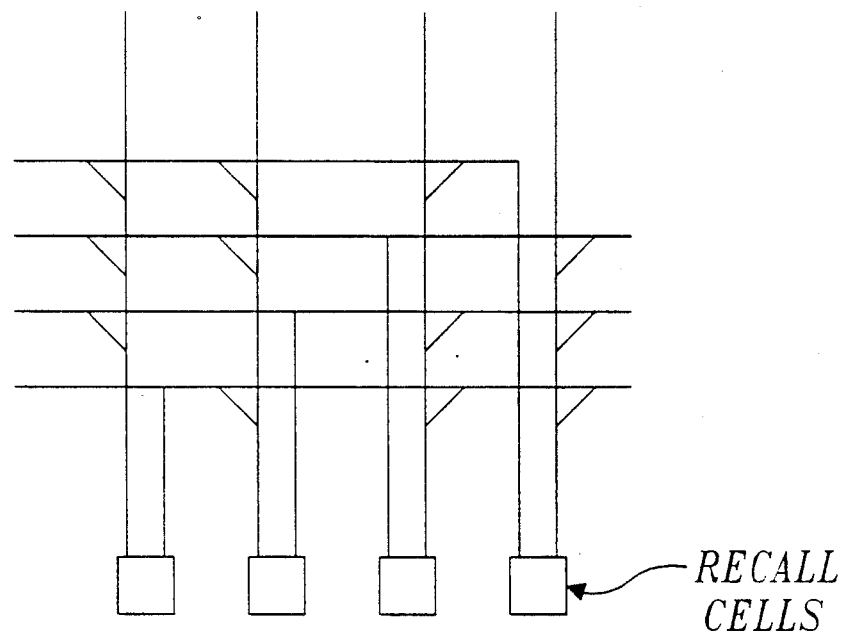

FIG. 7 represents networks similar to that of FIG. 3 but differing in that the recall cells are not disposed along a diagonal. In FIG. 7a) they are arranged in a random manner within the matrix. In FIGS. 7b) and 7c), they are located outside the matrix.

FIG. 8 schematically represents an electronic filter or associative memory circuit constructed in accordance with the present invention. The circuit has four axonic signal paths 81, 82, 83, 84 and four dendritic signal paths 85, 86, 87 and 88. The axonic and dendritic paths in this example are simple electrical conductors.

Connected to each axonic conductor is a respective recall cell R. The four recall cells 101, 102, 103 and 104 are located at the cross-over points between the axonic conductor 81 and dendritic conductor 85, axonic conductor 82 and dendritic conductor 86, axonic conductor 84 and dendritic conductor 88. The recall cell R of each element couples the respective dendritic conductor to the axonic conductor. Each recall cell R also has two enabling input terminals connected to respective recall control signal conductors 105 and 105a.

At all the other cross-over points between the axonic and dendritic conductors, there are the memory cells M (106-117). These contain the matrix connector links which are in the made or broken state.

The recall cell can be implemented in analog and/or digital circuitry. As a first example, analog circuitry for the recall cells will now be described with reference to FIGS. 8 and 13.

Figure 13:
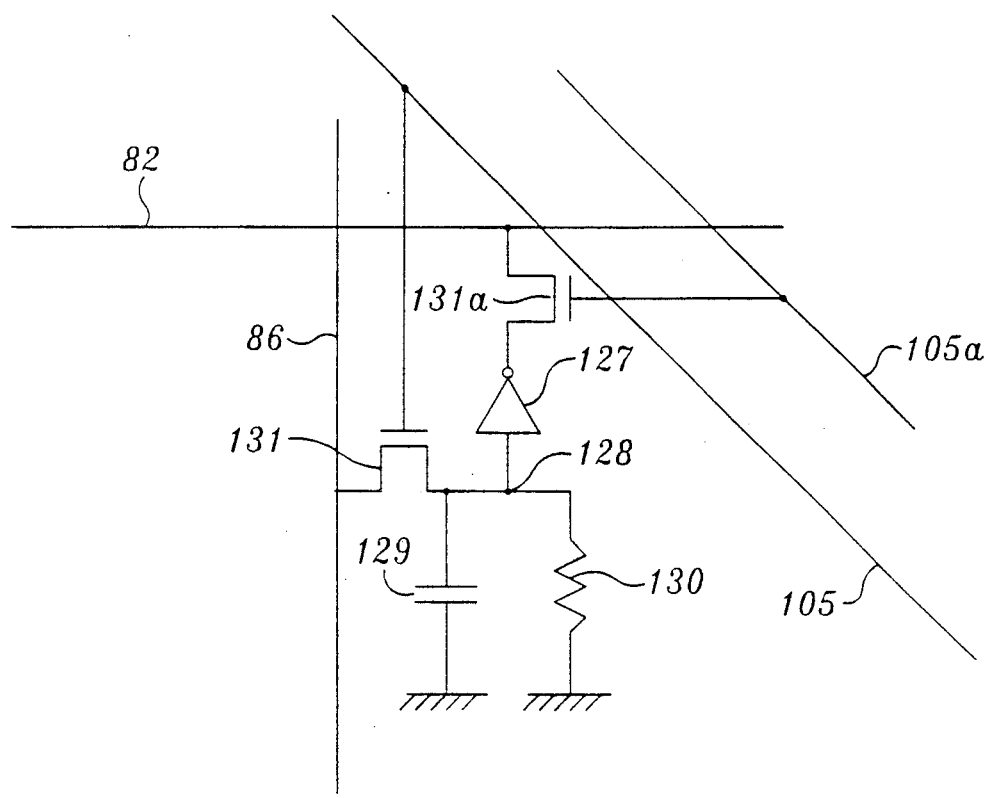

FIG. 13 shows the circuit of a recall cell R, which in this example, is the recall cell of element 102. The signal generator consists of a threshold detector 127, represented schematically as an inverter having its input terminal connected to a summing point 128 at a connection between a parallel combination of a capacitor 129 and a resistor 130, with a switching FET 131 coupling the summing point 128 to the dendritic conductor 86, and a switching FET 131a coupling the output terminal of the detector 127 to the axonic conductor 82. The threshold detector 127 may be an adjustable threshold CMOS inverter. The matrix connector links of the memory cells 109, 110 and 111 are coupled to the conductor 86 where the matrix connector links are required to be intact so that when the switching FET 131 is rendered conducting by the control signal on the recall control signal conductor 105, to which its gate is connected, active signals on the axonic conductors 81, 83 and 84 can be summed at the point 128. The signal accumulator is the capacitor 129, and the dissipator is the resistor to ground. Current flowing from the dendritic conductor 86 to the summing point 128 charges the capacitor 129 to a voltage level which depends on the magnitude of the current. The resistor 130 has a large resistance chosen to give the desired rates of rise of voltage at the point 128 when the FET 131 is conducting, and to give the desired rate of fall, i.e., decay, of voltage at the point 128 when the FET 131 is non-conducting. The detector 127 has an input threshold which ensures that its output does not switch between high and low levels unless the threshold is crossed. The low output level is 0 volts and the high output level is +5 volts, and these levels represent 0 and 1 respectively.

In FIG. 8 the axonic conductors 81 to 84 extend between a bidirectional input/output buffer 89 and a sensing circuit 90. The buffer 89 has four input/output terminals 91, 92, 93 and 94 which can be coupled respectively to the axonic conductors 81 to 84. The direction of the coupling is determined by the state of a binary signal on a control input terminal C I/O of the buffer 89. The coupling of signals from the axonic conductors 81 to 84 to the terminals 91 to 94 is enabled only when an enabling signal is present at an output-enable input terminal OE of the buffer 89. This enabling signal is supplied by the sensing circuit 90 when the sensing circuit determines that there is no further change in the pattern of activation of the axonic conductors 81 to 84. The sensing circuit 90 may be formed by four equal shift registers, each receiving its input from a respective one of the axonic conductors 81 to 84 and being clocked until the contents of all four shift registers remain constant for a predetermined duration, as sensed by suitable gating and timing arrangements. At the end of such a duration, the output enabling signal is supplied to the buffer 89.

Each of the axonic conductors 81 to 84 is connected to a respective input/output terminal of the buffer 89. It is arranged that whenever the axonic conductors are not supplying or receiving a signal from the buffer 89, each axonic conductor is effectively connected to a high impedance at the buffer 89. It may further be desirable to provide means for clamping earth level signals on the axonic conductors 81 to 84, such as the inverter and FET switch circuits 100 shown.

In operation, the recall cells R are initially coupled to the dendritic conductors 85 to 88 but not to the axonic conductors 81 to 84, by the presence of an enabling signal of the conductor 105, which renders all the FETs 131 conducting, and the presence of a disabling signal on the conductor 105a which renders all the FETs 131a non-conducting. The recall cell capacitors 129 are initially discharged by momentary grounding through FETs 95 to 98 by the application of an initialising signal to a control conductor 99.

If the net has been programmed with the target vector 0101, so that the matrix links of memory cells 111 and 116, between recall cells of elements 102 and 104, are broken, leaving the remainder in the made state, and if a key vector 0111 is then applied to the buffer input terminals 91 to 94, the pattern of activation represented by the key vector is applied by the buffer 89 to the axonic conductors 81 to 84 so that the conductor 81 is at 0 volts and the conductors 82 to 84 are at +5 volts. The recall cell capacitors 129 are charged up by the currents being supplied through the memory cells 106, 107, 108, 109, 110, 112, 113, 114, 115 and 117. The terminals of the buffer 89 connected to the conductors 81 to 84 are then switched into their inactive high impedance state, and then the FETs 131a are rendered conducting by an enabling signal on the conductor 105a. The threshold detectors 127 of the recall cells R of elements 102 and 104 decay below their switching threshold and so switch on before the inputs to the detectors 127 of elements 101 and 103 fall to the threshold. Consequently the recall cells of elements 101 and 103 receive additional inhibiting current from the axonic conductors 82 and 84 which are now held at the active level of +5 volts by their recall cells R. Since the recall cells R of the elements 102 and 104 do not affect each other's operation, there being no paths through the memory cells 111 and 116, a stable condition has been thus reached, in which the conductors 82 and 84 are held high by elements 102 and 104, and conductors 81 and 83 are held low by the elements 101 and 103. Thus, the target vector 0101 is recalled in response to the key vector 0111 and can be read out by the buffer 89 to its terminals 91 to 94 when the output from the sensing circuit 90 indicates a stable condition on the conductors 81 to 84 and applies an output enabling signal to the input OE of the buffer 89.

If a key vector 1000 is applied, the recall cell R of element 101 applies +5 volts to the conductor 81, and the conductors 82, 83 and 84 remain at 0 volts as a result of inhibition of the elements 102, 103 and 104 through the memory cells 109, 112 and 115. Thus, a temporary memory of the key vector 1000 is retained and can be read out from the buffer 89. Similarly the key vector 0010 is retained. Application of the key vector 1010 results in intermittent activation of the conductors 81 and 83 due to synchronous cyclic charging and discharging of the capacitors 129 of the recall cells of elements 101 and 103.

The circuit of FIG. 8 behaves generally in the same manner as the network of FIGS. 2 to 4, and a circuit having a fifth recall cell, axonic conductor and dendritic conductor, and the corresponding memory cells would behave substantially identically to a network implementing a multiplicative decay function as represented in FIG. 5.

It is assumed that the threshold detector implements a sharp step function in the axonic signal; however, in certain circumstances, a sloping function, by which the axonic signal is progressively reduced to zero over time as the charge in the capacitor rises to a cut-off level, might be the function of choice.

An important additional capacity of an analog implementation that can only store and recall idealised binarised target vectors, in the form of strings of binary digits, is that it can deal with key vectors with continuously varying or real number components. To enable this facility to be used, an input/output (I/O) buffer capable of transmitting analog signals is provided.

FIG. 17 shows part of the circuit of FIG. 8 in which digital recall cells, R are used. In these cells the accumulator is a bi-directional binary counter 148. At the beginning of a recall phase, the counters 148 are all reset to zero by a signal on the initialising control conductor 153. Then the contents of the buffer 89 are read onto the conductors 81 to 84 by application of a read pulse to a read-in control conductor 157. The conductor 157 is connected to a read sequencing signal path 158 formed by a series connected set of three delay devices 159. The gates of normally nonconducting FETs 160 are connected to the signal path 158 so that the connection of the axonic conductors 81 to 84 to the buffer 89 can be effected in the sequence 81, 82, 83, 84 for a duration that generates a pulse on any one of the conductors 81 to 84 which is activated by its connection to the buffer 89. Each pulse from a signalling conductor generates a pulse on the dendritic conductors to which it is connected by memory cell links M. Since the read operation is sequential, these pulses cannot collide, and are counted up by the respective counter 148, the FET 154 being rendered conducting during the read operation by an enabling signal on the upcounting control conductor 105.

In the simplest case, the dissipator is a down-counting input terminal of counter 148. A number of pulses is then applied to the down counting input terminal of the counter 148 from the decay signal conductor 155, the number being fixed and depending on the parameters of the patterns and network circuit. In the present example, one pulse may be applied so that the count in the counter 148, accumulated during the read operation, is decreased by one.

The signal generator of each recall cell in FIG. 17 is a NOR gate. Each NOR gate 147 has a number of input terminals equal to the number of stages in the binary counter 148, and each input terminal is coupled to a status output terminal of a respective one of the stages of the counter 148 by an FET switch 152. This coupling arrangement is represented schematically in FIG. 17. The NOR gate 147 and its input switch 152 may in practice be implemented in the form of an OR gate connected to the status output terminals of the counter 148. It may be possible to dispense with the switches 152 completely and simply employ a NOR gate 147 having input terminal connected directly to the counter stage status terminals. The switches 149 would be retained.

When the accumulator signals have been dissipated, the NOR gates 147 are enabled by a signal on the conductor 156 to the FET switches 152 so that the outputs from the gates 147 depends on the decremented count in the counters 148. The output of a gate 147 will only be high if the respective counter 148 contains the zero count. The FETs 149 are then enabled in sequence by the application of a pulse to the input end of the read out signal path 150. This path is formed by a series connected set of three delay devices 151 so that the gate of FET 149 in recall cell 101 is connected to the input terminal of the first delay device 151. as shown in FIG. 17, and the gates of the FETs 149 of cells 102, 103 and 104 are connected to the output terminals of the first, second and third delay devices 151, respectively. Consequently, a pulse is generated on each axonic conductor at which the count in the recall cell is zero. Throughout the generation of this sequence of pulses, the FETs 154 are again held conducting by a signal on the conductor 105 so that the respective counts are increased by the number of pulses from the axonic conductors which reach the respective dendritic conductors through memory cells. The cycle of decrementing the counts by a fixed number of pulses applied through the conductor 155, and incrementing the counts by enabling the FETs 149 in sequence is continued until a fixed pattern of activation of the axonic conductors 81 to 84 is detected by the sensing circuit 90, and the target vector is read out.

The relaxation of noisy key vectors into the best fit target vector in an auto-associative network consisting of 5 cells and implementing the same subtractive decay function has been described with reference to FIGS. 2 to 4 and 18, and the circuits described above would give substantially the same performance.

A digital recall cell can be constructed that employs a multiplicative decay factor analogous to that of the capacitive recall cell of FIG. 13, and the operation of such a network of cells implementing decay factors of 0.5 has been described with reference to FIG. 5. The alternative digital recall cell has a binary counter in which to accumulate inhibition pulses, and a shift register for effecting division by 2 or a power of 2. The shift register has the same number of stages as the binary counter and each stage of the binary counter has a status output terminal connected to a write input terminal of the corresponding stage of the shift register so that the contents of the binary counter can be moved into the shift register. Shifting is then effected so as to lose at least the least significant digit of the counter contents, and a 0 is inserted at the other end of the shift register for each digit lost. Thus, division by 2 or 4 and so on is effected. The number represented in the shift register is then moved into the binary counter (or subtracted from the number in the binary counter to effect multiplication e.g. by $\frac{3}{4}$ or $\frac{7}{8}$) and further inhibiting pulses, if any, are added to the number returned by the shift register. Those skilled in the art will understand that digital circuitry for division by decay factors that are not multiples of 2 can be constructed.

The digital recall cell of FIG. 17 can be modified to employ a non-zero threshold count in the counters 148, in which case the NOR gates 147 are replaced by a suitable decoder which provides a low output whenever the count is above threshold and a high output whenever the count is below threshold.

An alternative for the signal generator component of the recall cell would be an oscillator. If the accumulator is a capacitor, then a Varactor diode can be used as a part of the circuit of an oscillator, and the frequency of oscillation can be varied by varying the voltage across the reverse biased Varactor diode with the charge on the capacitor. The capacitors, in turn, would accumulate charge from the pulses produced by the oscillators of other recall cells. If the accumulator is a counter or shift register, then a ring oscillator could be used, with the level of signal registered in the counter being used to select the delays in the oscillator, or the number of inverters in the ring. The advantage of using an oscillator with the counter-type accumulator is that there is then no need to read off the states of the threshold detectors sequentially during each cycle. If the pulses are sufficiently short and the oscillators operate asynchronously, at low frequencies, the number of collisions or occlusions between pulses on the dendritic conductor is negligible. The signal can be dissipated at regular intervals, subtractively or multiplicatively, and the rate of oscillation can indicate the difference between the level of accumulated signal, and threshold, and so fine-tune the relaxation process. Frequency of oscillation could also be used to represent vector component values in both key and target vectors during communication with the external devices.

The circuitry of the link matrix nets can be programmed during manufacture like a ROM, with links being specified as present or absent (or partially conducting). Alternatively, the net connectivity may be user-programmable, like an EEPROM, PROM or RAM. This requires a special 'Teach' phase and 'Teach cells' and circuits. Before the circuit of FIG. 8 has undergone any teach phase, each memory cell M provides a path for signals to pass from the axonic conductor to the dendritic conductor connected thereto. During a teach phase, the target vectors, or patterns of firing and not-firing elements are first loaded onto the axonic conductors of the network. Then the recall cells are disabled and the teach cells enabled. This causes the path through each memory cell to be broken or blocked if the axonic conductors of both elements to which the memory cell is connected are firing. Subsequently, the firing of any subset of these elements increases the probability that the other elements in the set will also fire.

Figure 12:
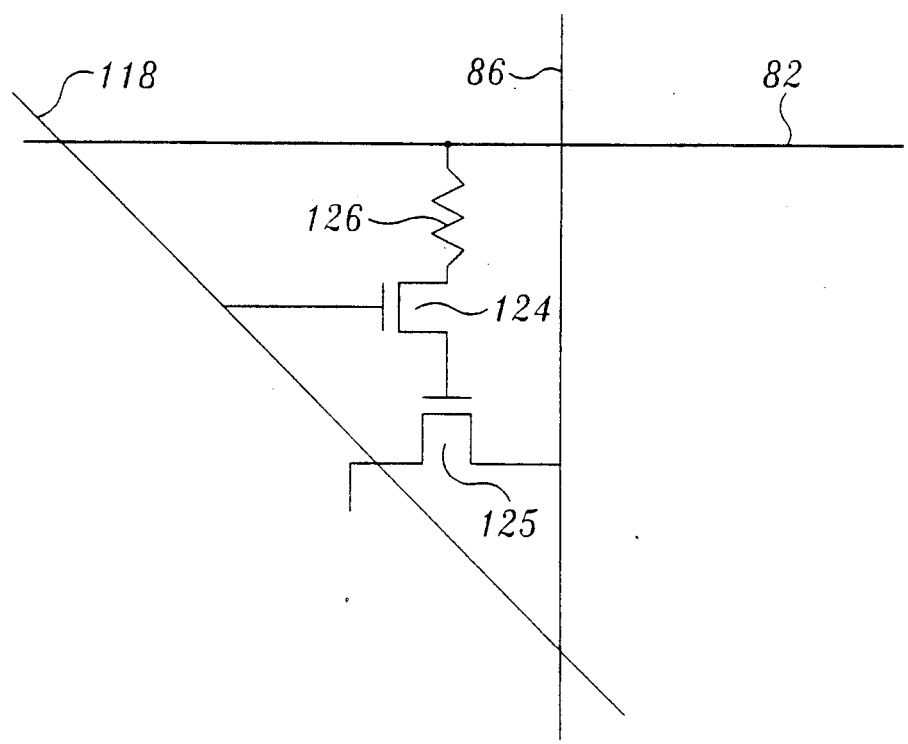

For a teach phase, the teach cells T are enabled by an enabling control signal on conductor 118. The buffer 89 has a further input terminal CV to which a control signal is applied for controlling the application to the axonic conductors 81 to 84 of a high voltage, for example, 25 volts, during a teach phase. FIG. 12 shows the circuit of a teach cell T. If teach control conductor 118 is high, and the axonic conductor 82 is active, i.e., at +25 volts, the FETs 124 and 125 become fully conductive and the dendritic conductor 86 is grounded through the FET 125.

Figure 14:
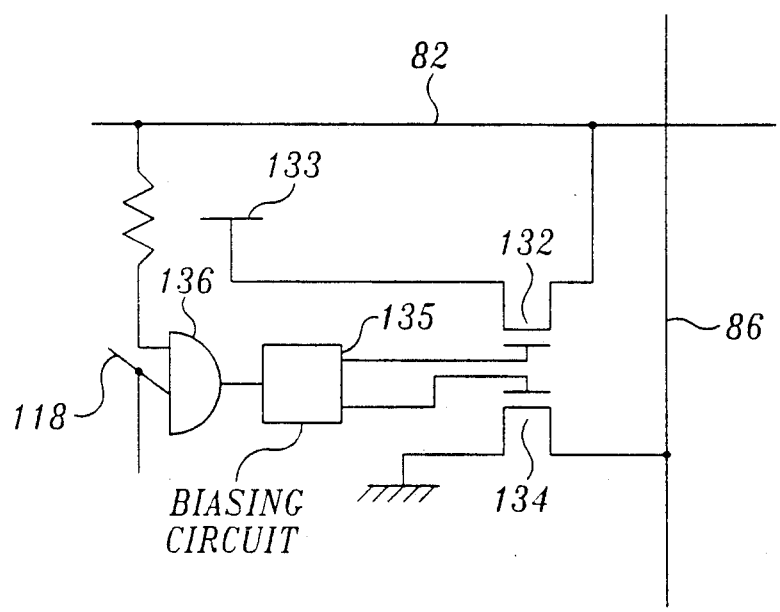

FIG. 14 shows an alternative teach cell circuit. If the conductor 82 is firing and the teach control signal is firing on the conductor 118, the output of the gate holds the biasing circuit 135 in the state in which the FETs 132 and 134 are conducting, so that conductor 82 is connected to the high voltage rail 133 at +25 volts, and the conductor 86 is grounded.

Figure 9:
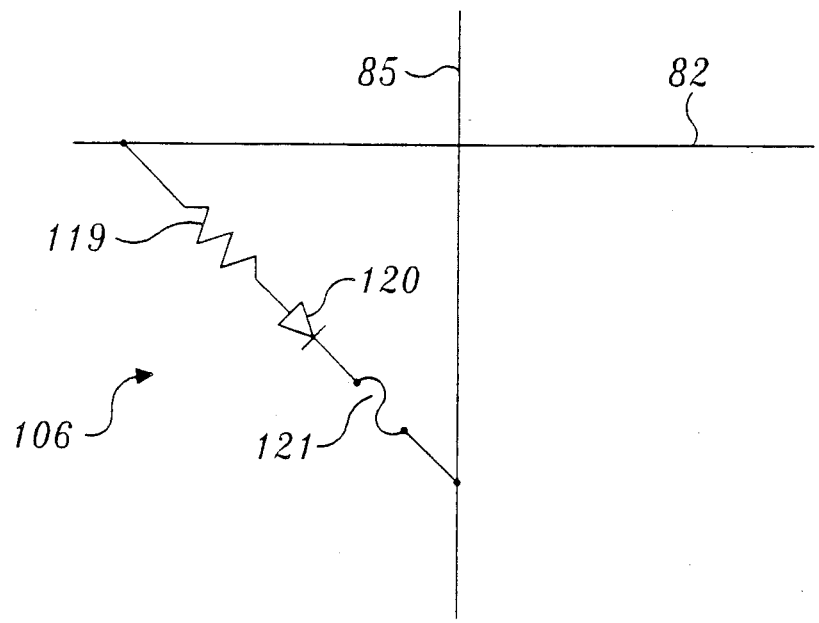
Figure 10:
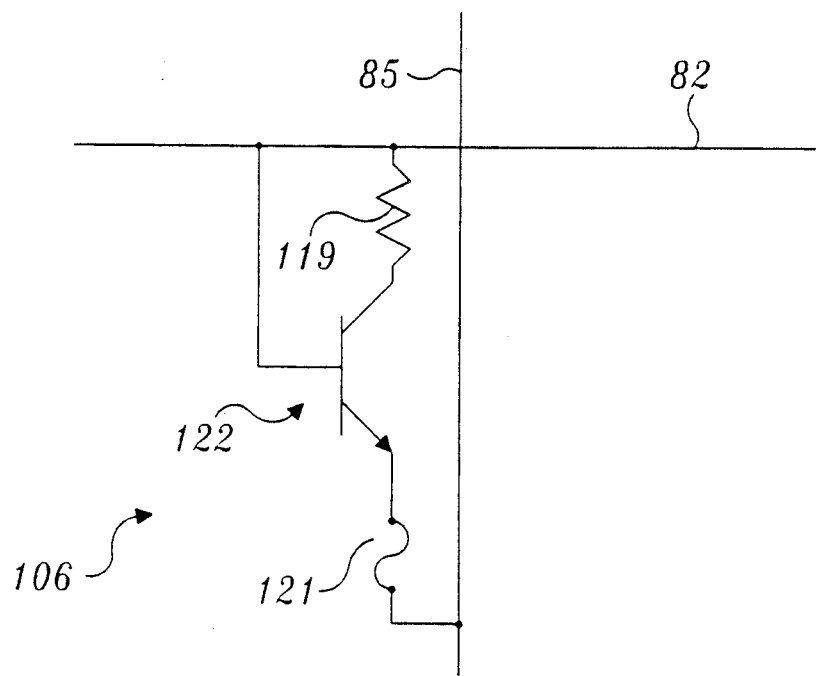
Figure 11:
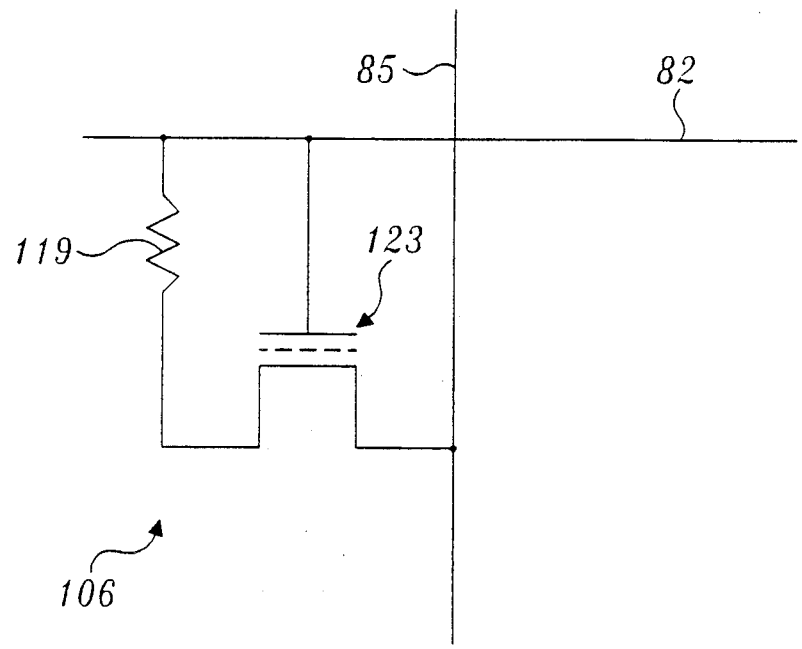

FIGS. 9 to 11 are circuit diagrams of PROM and EEPROM-like memory cells M in which matrix links are broken by the presence of +25 volts on the axonic conductor 82 when the dendritic conductor 85 is grounded. In FIGS. 9 and 10, the fuses are blown; in FIG. 11, the fuse is replaced by a floating-gate FET 123.

FIGS. 15, and 16 show respectively digital circuits for use as an alternative teach cell T and memory cell M analogous to conventional RAM memory. When the teach control signal 118, and the axonic conductor 83 are both active, memory cells 112, 113 and 114 are enabled by conductor 142. Before any information is stored in the cell, the flip flop 145 is initially reset by a pulse on the conductor 143 and thus renders the FET 144 conducting. If in the teach phase the enabling conductor 142 and the axonic conductor 82 are active, the AND gate 146 produces an output that sets the flip flop 145, and thereby renders the FET 144 non-conducting, blocking the signal path between the axonic conductor 82 and the dendritic conductor 87. Those skilled in the art will appreciate that equivalent circuits can be designed using dynamic MOS RAM and refreshing circuits.

In the fused memory cells described hereinbefore, nichrome or polysilicon fuses may be used. The floating gate FET memory cell of FIG. 11 may be a floating-gate avalanche MOS device (FAMOS), which is rendered non-conducting by high voltage between its source and drain. The high voltage traps charge on the floating gate. The device can be caused to revert to its conducting state by irradiation with ultraviolet light. Alternative mechanisms include avalanche induced migration in a junction transistor. Those skilled in the art will appreciate that the charge on a floating gate can be increased progressively with repeated exposure to high voltages so that the effective gain can be varied progressively. This capacity would have limited application in autoassociative nets because incomplete breaking of inhibitory links between cells signalling in the same vector would tend to cause the least inhibited cells to eventually inhibit the more inhibited cells in the same vector.

A combination of hetero-associative and auto-associative network circuitry is represented schematically in FIG. 25. In this case the input conductors 300 by which the input vectors are presented to the dendritic conductors 13 of the recall cells 11 are physically separate from the axonic conductors 12 interconnecting recall cells in the net. The input conductors 300 are connected to the dendritic conductors 13 by a matrix of connector links 301. These are programmed in the same way as for the auto-associative function. Matrix links 301 between the firing input conductors 300 in the input vector and the dendrites 13 of firing recall cells in the target vector are broken. This enables the net to perform hetero-associative functions, whereby binary input vectors, represented in the pattern of signals on the input conductors, can be associated with quite different binary target vectors represented by the pattern of recall cell firing.

In the simplest case, each target pattern contains only one firing recall cell, and the auto-associative net matrix links 14 are all in the made state. If each recall cell is associated with one, or a set of input vectors, and there is no overlap between the sets of input vectors associated with different cells, then the recall cells can be used to classify key input vectors into their associated sets. A key input vector will produce inhibitory signals on the dendrites of all recall cells except that with which it has been associated. This cell will fire and so inhibit the other recall cells. A 'noisy' key vector containing spuriously signalling input conductor lines is likely to inhibit the associated recall cell also, but, as this cell probably receives least inhibition, it will probably recover before the other cells and establish itself in the net.

If the target vectors consist of patterns of several firing cells, then these patterns must be also programmed into the recurrent autoassociative matrix links 14 by breaking links between the axons and dendrites of firing cells in the same target vectors, so that the auto-associative net can convert noisy key vectors into the most similar target vector.

In operation, key vectors are established on the input conductors 300, and held while the recall cell accumulators register dendritic signals; the auto-associative net is then allowed to cycle. When the sensors indicate that the network has relaxed, the target vector can be read off the recall cell axons 12.

Another combination of hetero-associative and autoassociative circuits which is a modification of the circuit of FIG. 8 is represented schematically in FIG. 19. In this case key vectors are relaxed into noise-free target vectors in the auto-associative net before entering the sensing circuit 90 of FIG. 8 (not shown in FIG. 19). The hetero-associative link matrix 161, like that in FIG. 25, can be programmed to map the input vectors on axons 81–84 onto output vectors on the input/output buffer 163 by selectively cutting links between signalling conductor lines in associated vectors.

This programming can be carried out during manufacture, or by the use of the teach cells and circuits shown in FIGS. 20 and 21 which are equivalent to those in FIGS. 9–17. There is no need to accumulate and dissipate signals, so the recall cells can consist simply of inverters or S-R flip flops.

If the links from axon lines 81–84 are replaced by shunts, the dendrite line operates like a NOR-column, and the recall cell inverters can be replaced by amplifiers. For example, FIG. 22 shows a dendritic conductor 162 with memory cells 201, 202, a teach cell 203 and an input/output buffer 204. Two axonic conductors 83 and 84 are shown coupled to the dendritic conductor 162. One end of the conductor 162 is permanently supplied with a high signal through resistor 213. In a teach phase, a teach signal on the conductor 209 enables the FET 206 and, if a high signal is being applied to the buffer terminal 210 at the input of the amplifier 208, the FET 207 from the high voltage rail is also enabled, so that +25 volts appears on the dendritic conductor 162. The memory cells each consist of a grounded fuse 211 coupled to the conductor 162 through an FET 212 having its gate connected to the respective axonic conductor. If the axonic conductor is active, the FET 212 conducts and the high voltage on the dendritic conductor 162 blows the fuse 211. In a recall phase, the dendritic conductor remains high, at +5 volts, unless the FET 212 of an intact memory cell is made to conduct by the presence of a high signal on the respective axonic conductor; in which case the dendritic conductor 162 is grounded through the memory cell, and amplifier 205 and output line 210 are set low.

FIG. 6 shows schematically a part of an auto-associative network feeding into a hetero-associative network like that in FIG. 19. A recall cell 17 has its dendrite 15 initially connected to each of five axons 12 of the elements forming the network of FIG. 4. This dendrite 15 has three made synaptic links 14 and two broken synaptic links 14'. If the dendrite 15 is normally supplied with signal only from the axons 12, the recall cell 17 will be inactive, and therefore provide no output signal on its axon 16 whenever there is a signal on at least one of the first, third and fifth axons 12, and will become active if there are no signals on these three axons 12. Thus, there is an output on the axon 16 if any one of the vectors 0,1,0,0,0, 0,1,0,1,0 and 0,0,0,1,0 is present on the axons 12. With the arrangement of FIG. 6, there is also an output from the axon 16 is the zero vector 0,0,0,0,0 is present. A combination of two elements is also shown in FIG. 6 in which a first element with dendrite 19, recall cell 18, and axon 20 is coupled to a second element with dendrite 221. recall cell 22. and axon 23. The axon 23 serves as an output path. The matrix links of the dendrite 19 are in a pattern complementary to those of the dendrite 15 so that the axon 20 is active unless any of the vectors X,1,X,0,X, X,0,X,1,X and X,1,X,1,X are present, where X is either 1 or 0. As a result, the axon 23 is only active when any one of those vectors is present. Such an arrangement can detect recall of the vector 0,1,0,1,0 by the network of FIG. 4.

The network in FIG. 2, with all cells mutually inhibitory, and with a threshold of one, performs a constraint satisfaction task in which only the key vector component of greatest value is set to one in the target vector. If the threshold is increased to 3, then the three greatest key vector components are set to one in the target vector. If the inhibitory links between adjacent cells are also broken, then only the pair of adjacent key vector components with the greatest total value are set to one in the target vector. Similarly, if only links between adjacent cells are operative, then there would be a constraint on the occurence of adjacent target vector components with a value of one.

Local inhibitory circuits can also impose constraints on the local configurations of firing cells in multi-dimensional arrays. FIG. 23 shows how a cross-shaped key pattern of activity in a square array of recall cells could be relaxed to give the single diagonal line best satisfying two constraints which have been found useful in image processing, particularly in models of stereopsis. The first constraint minimises the number of cells signalling in the same rows and columns (representing number of surfaces superimposed along the same sight lines), and the second constraint maximises the number of adjacent cells aligned along one diagonal (representing adjacent points in the same depth plane). In FIG. 23 this preferred diagonal is the 45-225 degree diagonal from upper right to lower left.

The first constraint can be implemented simply by mutual inhibition between cells in the same rows and columns, but the second constraint requires a more complicated pattern of inhibitory connections between cells in adjacent rows and columns, excepting the cells in the preferred diagonal. In such circumstances, it may be more convenient to provide direct disinhibitory signals between cells instead of the alternative more complex inhibitory circuits. For example, the second constraint is implemented in the network in FIG. 24 by disinhibitory links 04 between adjacent cells in the preferred diagonal.

Disinhibitory circuits are provided by means of a disinhibitory auxiliary dendritic signal path to each recall cell, in addition to the inhibitory dendrit  conductor already described with reference to  iGS. 1a),2,3,4,8,13 and 17. FIG. 1b gives a schematic representation of the disinhibitory dendritic conductor 04 which crosses the axonic conductors 12 of the other recall cells, receiving signals from recall cells via links 14 in the connector matrix. The disinhibitory auxiliary dendritic conductor's signals are fed to the dissipator 03 and temporarily increase the rate at which the dissipator reduces the signal in the accumulator 02. In the analog recall cell shown in FIG. 13, signals on the disinhibitory auxiliary dendrite (not shown) reduce the accumulated signal on capacitance 129, either by decreasing a resistance in series with resistor 130, or by opening a parallel resistance to ground.

In the distal recall cell shown in FIG. 17, disinhibitory signals received during a temporal interval increase the number of counts by which the signal registered in the binary counter is reduced during that temporal interval. In the simplest case, the disinhibitory auxiliary dendrite (not shown in FIG. 17) is connected to the down-counting input terminal of binary counter 148, and each pulse on the axonic conductors with operative links to the disinhibitory dendrite subtracts one, or a prespecified number, from the accumulated signal in the counter 148.

FIG. 24 is a schematic representation of the circuitry required to implement constraints one and two. For convenience, the recall cells are numbered 1 to 9. Each recall cell receives signals from an inhibitory dendrite 13 on its left and a disinhibitory auxiliary dendrite 04 on its right. The inhibitory dendrite of each recall cell picks up signals from the axons of the other recall cells in the same row and column. The disinhibitory auxiliary dendrite of each recall cell receives signals from adjacent recall cells in the same 45–225 degree diagonal. For example, the inhibitory dendrite of recall cell 5 receives signals from the axonic conductors 12 of recall cells 2,4,6,8, and the disinhibitory auxiliary dendrite receives signals from the axonic conductors 12 of recall cells 3 and 7.

FIG. 23 shows how the state of the network in FIG. 24 evolves with time after receiving the key pattern (in FIG. 23a). As in the examples in FIGS. 4 and 18, recall cells are assumed to have a threshold of one, recall cells with subthreshold accumulated signal emit one pulse on their axon per time interval, and accumulated signals decay by one per interval. The key pattern (23a) produces one inhibitory signal in the accumulator of each recall cell for every other cell in the same row or column (23b). However, the disinhibitory circuits are assumed to subtract one signal from the accumulator for every other cell in the same 45-225 degree diagonal (23c). The remaining signal is then reduced by one by the dissipator (23d), and the signal generators fire in those cells with sub-threshold levels of signal (23e).

Each of the networks described herein before with reference to FIGS. 8 to 25 require control circuits to supply the various control and initialisation signal which effect the sequence of operation of the components of the networks. Such control circuits can be driven by a clock oscillator and may take the form of a simple electronic solid state machine such as a read only memory driven by a microcontroller. Alternatively, simple dedicated counting and logic circuitry can be constructed by those skilled in the art to provide the required sequences of signals.

With networks formed in this manner and having a large number of elements and a suitable threshold at which an element switches from being inhibited to being active, a significant degree of immunity to noise can be achieved in recalling target vectors from noisy key vectors. Furthermore, such a network can still function usefully after sustaining a certain amount of permanent damage such as destruction of some neurons or parts of some neurons. As described, the net is not restricted to dealing with binary key vectors, and vectors with integer and real components can be similarly processed.

The present invention provides signal processing apparatus constructed in accordance with the principles of the electronic neural network models described. Such processing apparatus may find particular application in the fields of pattern recognition, digital filtering, and memory architecture. The invention further provides inanimate analogies, such as VLSI circuits, electro-optical structures, and physico-chemical systems, of the electronic neural models considered herein. It will be appreciated that the present invention is suitable for implementation in a number of different ways using valve or solid-state electronic components, or optical components or a combination of electronic, valve, and-/or optical components.

Figure 26A:
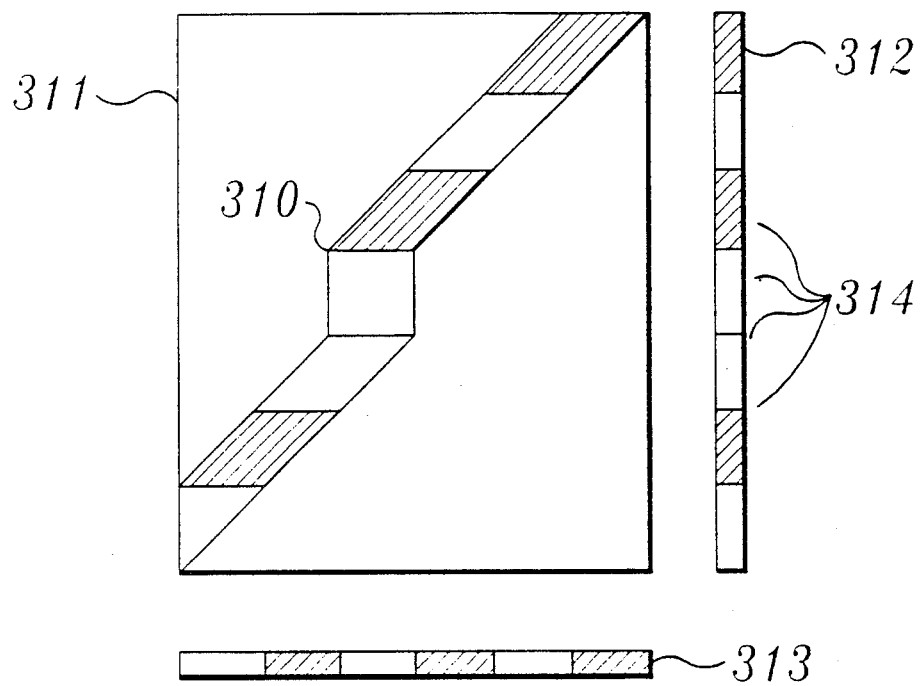
Figure 26B:
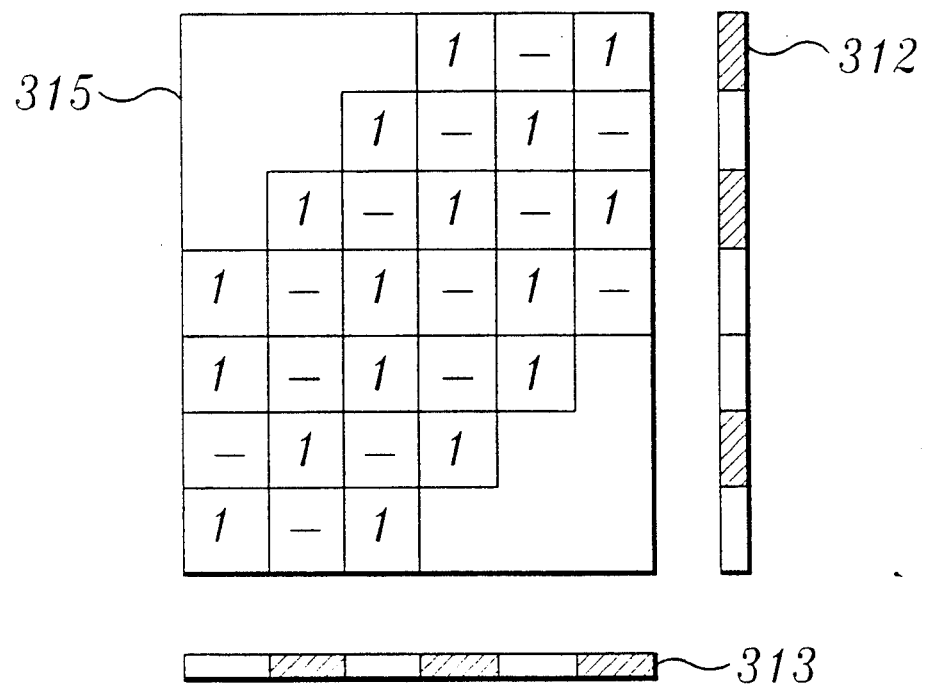

FIG. 26 is a schematic representation of this constraint satisfaction process on a larger scale showing how the key pattern might be generated. FIG. 26a) shows a stepped figure 310 textured with black and white stripes disposed along the diagonal of a rectangle 311. This rectangle is being monitored from the right by a vertical 'retina' 312, and from below by a horizontal retina 313. Each retina consists of an array of receptor's 314. Each receptor monitors a 'sight-line' normal to the retinal surface, and registers the colour of the stripe on the figure 310 intersecting its sight-line. These receptors are monitored, in turn, by the matrix 315 of 'binocular' elements shown in FIG. 26b). Each intersection between the sight lines of receptors from different retinas in the rectangle 311 in FIG. 26a) is represented by an element in the corresponding location in the matrix 315 in FIG. 26b). (Corner elements representing opposite ends of the figure 310 are not used.) These elements are inhibited if the receptors in its sight lines are registering different colours, but they are disinhibited and can fire spontaneously if the colours are the same. In the resultant key pattern of activity in matrix 315, disinhibited elements are represented by '1', and inhibited elements by '—'.

While this key pattern does contain a representation of the stepped figure 310 along the corresponding diagonal of matrix 315, it also contains a high proportion of spuriously firing matrix elements caused by chance matches. The constraint satisfaction network eliminates this noise from the key pattern.

FIG. 26c) shows the sequence of firing patterns and accumulator signal in a network relaxing the key pattern in FIG. 26b) where each matrix element is a recall cell using a multiplicative decay function. Three time intervals are required to eliminate all the noise. During each time interval, each recall cell first multiplies the accumulator signal from the preceeding interval by 0.5, then adds one signal unit for each non-adjacent firing firing cell in the same row and column, and subtracts one signal unit for each adjacent firing recall cell in the same 45-225 degree diagonal. If this total is less than the threshold of one, then the recall cell fires during the next time interval. The initial accumulator signal is zero.

I claim:

1. A signal handling element comprising a first signal port, a second signal port, accumulating means and adjusting means, the accumulating means being capable of accumulating the values of signals supplied to the first signal port and the adjusting means being capable of reducing the value of the accumulated signal over a period of time, and means for supplying an output signal to the second port, the arrangement being such that when the contents of the accumulating means are above a certain value, a predetermined output signal is not supplied to the second port.

2. An element as claimed in claim 1, wherein the adjusting means is a dissipator for reducing the value of the accumulated signal as a function of time.

3. A network comprising a plurality of elements, each element including a first signal port, a second signal port, accumulating means and adjusting means, the accumulating means being capable of accumulating the values of signals supplied to the first signal port and the adjusting means being capable of altering the value of the accumulated signal over a period of time, each element further including means for supplying a predetermined output signal to the second port, and threshold means operable to inhibit the output signal from being supplied to the second port when the value of the accumulated signal passes a fixed threshold level, the network further comprising a plurality of first signal paths each connected with said first signal port of a respective element, a plurality of second signal paths each connected with said second signal port of a respective element and at least one signal coupling means, the or each signal coupling means connecting the second signal path associated with one element with the first signal path associated with at least one other element in the network.

4. A network as claimed in claim 3, wherein the threshold means are operable to inhibit the output signal from being supplied to the second signal port when the value of the accumulated signal exceeds the fixed threshold value.

5. A network as claimed in claim 3, in which the accumulating means comprises capacitive means and each adjusting means comprises resistive means in parallel with a corresponding one of the capacitive means.

6. A network as claimed in claim 3, wherein the accumulating means include pulse counting means.

7. A network as claimed in claim 3, wherein the signal coupling means is degradable to reduce the degree of signal coupling between said second signal path of the one element and said first signal path of said at least one other element in the network.

8. A network as claimed in claim 7, wherein the signal coupling means between two elements is degradable by means of signals applied contemporaneously to the second signal paths of both elements in conjunction with a control signal.

9. A network as claimed in claim 3, wherein the signal coupling means comprise a diode which conducts signals from the second signal path associated with a corresponding element to the first signal path of at least one other element.

10. A network as claimed in claim 3, wherein each element includes a third port and the arrangement is such that when an output signal from a different element is supplied to the third port, the alteration of the contents of the accumulating means by the adjusting means is accelerated.

* * * * *